(12) United States Patent
Ido et al.

(10) Patent No.: US 7,883,483 B2
(45) Date of Patent: Feb. 8, 2011

(54) CONTROL DEVICE AND CONTROL PROGRAM OF WALKING ASSISTING DEVICE

(75) Inventors: Tetsuya Ido, Wako (JP); Yasushi Ikeuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 34 days.

(21) Appl. No.: 11/908,351

(22) PCT Filed: May 29, 2006

(86) PCT No.: PCT/JP2006/310659
§ 371 (c)(1),
(2), (4) Date: Sep. 11, 2007

(87) PCT Pub. No.: WO2006/129599

PCT Pub. Date: Dec. 7, 2006

(65) Prior Publication Data
US 2008/0312049 A1 Dec. 18, 2008

(30) Foreign Application Priority Data
May 31, 2005 (JP) ............................. 2005-158516

(51) Int. Cl.
*A61H 1/00* (2006.01)

(52) U.S. Cl. ............................... 601/5; 601/35; 602/16; 602/26; 602/27; 482/66

(58) Field of Classification Search ................ 482/1–9, 482/51, 66, 67, 69, 74, 75, 76, 900, 901, 482/902; 434/247, 257; 135/66, 67; 623/24, 623/27, 34, 53; 602/5, 16, 23, 24, 25, 26, 602/27; 601/5, 23, 33, 34, 35; 600/595
See application file for complete search history.

(56) References Cited

U.S. PATENT DOCUMENTS 5,961,476 A * 10/1999 Betto et al. ................... 602/16
6,666,796 B1 12/2003 MacCready, Jr.

(Continued)

FOREIGN PATENT DOCUMENTS

DE       44 08 351        9/1994

(Continued)

*Primary Examiner*—Loan Thanh
*Assistant Examiner*—Daniel F Roland
(74) *Attorney, Agent, or Firm*—Rankin, Hill & Clark LLP

(57) ABSTRACT

A control device and a control program of a walking assisting device, wherein a desired assist ratio, which is a desired value of the ratio of a force to be supplied by a walking assisting device (1) in a total tread force of a user (A) relative to the total tread forces is set, the shares of a lifting force to be applied to the user (A) from a seating part (2) which are to be borne by the leg links (3L, 3R) are determined from the desire assist ratio and the tread forces of the legs of the user (A) measured on the basis of outputs of force sensors (38, 38, 39, 39), and actuators (27, 27) of the leg links (3L, 3R) are controlled such that the determined shares of the lifting force are generated from the leg links (3L, 3R). Thus, a force required for the user (A) to support himself/herself by his/her legs on a floor can be reduced while reducing the number of parts to be attached to each leg of the user (A), and an assisting force for achieving such reductions can be properly shared between the leg links (3L, 3R) corresponding to the legs of the user (A).

10 Claims, 13 Drawing Sheets

U.S. PATENT DOCUMENTS

2006/0211956 A1* 9/2006 Sankai ........................... 601/5
2006/0276728 A1* 12/2006 Ashihara et al. ................ 601/5
2008/0234608 A1* 9/2008 Sankai ........................... 601/5

FOREIGN PATENT DOCUMENTS

| | | | |
|---|---|---|---|
| GB | 2278041 A | * | 11/1994 |
| JP | 05-329186 | | 12/1993 |
| JP | 07-112035 | | 5/1995 |
| JP | 2003-220102 | | 8/2003 |

* cited by examiner

CONTROL DEVICE AND CONTROL PROGRAM OF WALKING ASSISTING DEVICE

TECHNICAL FIELD

The present invention relates to a control device and a control program of a walking assisting device adapted to assist a user (human being) with his/her walking.

BACKGROUND ART

Hitherto, as this type of walking assisting device, there has been known, for example, the one disclosed in Japanese Patent Laid-Open No. H5-329186 (hereinafter referred to as Patent Document 1). According to the walking assisting device (device for helping walking) described in Patent Document 1, supporting members are attached to the thigh, crus, and foot of each leg of the user. In the walking assisting device, the joints that join these supporting members are driven by actuators to impart a desired propulsion power to the user from the walking assisting device.

DISCLOSURE OF INVENTION

The walking assisting device described in the aforesaid Patent Document 1 is capable of generating a desired propulsion power in a direction in which the user is moving thereby reducing the propulsion power required to be generated by the user himself/herself. However, as is obvious from FIG. 15 in Patent Document 1, the weight of the user will have to be supported by the user himself/herself. This has led to unsatisfactorily reduced load on the user. In addition, the one in Patent Document 1 does not have a technology for properly dividing a desired propulsion power between the legs of the walking assisting device. Hence, there has been a danger in that a force that does not match a motion of each leg of the user acts on each leg of the user. Further, according to the one in Patent Document 1, the supporting members of the walking assisting device are attached to the thigh, the crus, and the foot, respectively, of each leg of the user, and forces are applied from the supporting members to the thigh, the crus, and the foot of each leg. This has been apt to make the user uncomfortable.

The present invention has been made with a view of the aforesaid background, and it is an object thereof to provide a control device and a control program of a walking assisting device that make it possible to reduce a force with which a user himself/herself has to support his/her legs on a floor and to properly divide an assisting force for reducing the aforesaid force by a leg link associated with each leg of the user while at the same time reducing the number of parts to be attached to each leg of the user.

To fulfill the aforesaid object, according to a first invention, there is provided a control device of a walking assisting device provided with a seating parting part that receives from above a part of the weight of a user sitting thereon, a pair of right and left thigh frames joined respectively to the seating parting part through the intermediary of first joints, a pair of right and left crus frames joined respectively to the thigh frames through the intermediary of second joints, a pair of right and left foot-worn assemblies that are respectively joined to the crus frames through the intermediary of third joints and respectively attached to the feet of the right and left legs of the user, and come in contact with the ground when the legs of the user become standing legs, an actuator for the left for driving the second joint among joints of a left leg link composed of the first joint, the thigh frame, the second joint, the crus frame, the third joint, and the foot-worn assembly on the left side, and an actuator for the right for driving the second joint among joints of a right leg link composed of the first joint, the thigh frame, the second joint, the crus frame, the third joint, and the foot-worn assembly on the right side, the control device including:

a treading force measuring means for measuring the treading force of each leg of the user on the basis of a force detection value indicated by an output of a first force sensor provided in each of the foot-worn assemblies;

a desired assist ratio setting means for setting a desired assist ratio, which is a desired value of a ratio of a force to be supplied by the walking assisting device in a total treading force, which is the total sum of the treading forces of the legs of the user, relative to the total treading force;

a desired lifting share determining means for determining a desired lifting share which is a desired value of a share of the left leg link and a desired lifting share which is a desired value of a share of the right leg link in an upward lifting force to be applied to the user from the seating parting part by multiplying a treading force of each leg of the user, which has been measured by the treading force measuring means, by the desired assist ratio; and an actuator controlling means for controlling an actuator for the left such that the lifting force actually imparted to the seating parting part from the left leg link becomes a desired lifting share of the left leg link determined by the desired lifting share determining means and also for controlling an actuator for the right such that the lifting force actually imparted to the seating part from the right leg link becomes a desired lifting share of the right leg link determined by the desired lifting share determining means.

According to the first invention described above, only each of the foot-worn assemblies of the walking assisting device is attached to the foot of each leg. Moreover, a user has only to sit on the seating part so that a part of his/her weight is rested thereon.

Further, according to the first invention, the treading force of each leg of the user measured by the treading force measuring means is multiplied by a desired assist ratio set by the desired assist ratio setting means thereby to determine a desired lifting share of the left leg link and a desired lifting share of the right leg link in an upward lifting force to be applied to the user from the seating part. In other words, the aforesaid measured treading force of the left leg of the user is multiplied by a desired assist ratio to determine a desired lifting share of the left leg link and the aforesaid measured treading force of the right leg of the user is multiplied by a desired assist ratio to determine a desired lifting share of the right leg link. Incidentally, the total sum of the desired lifting share of the left leg link and the desired lifting share of the right leg link corresponds to the desired value of the total lifting force applied to the user from the seating part, and this will be substantially equal to a force obtained by multiplying a total treading force of the user by the aforesaid desired assist ratio.

In this case, a treading force of the right leg and a treading force of the left leg of the user measured by the treading force measuring means reflect an intention of a user on how to support his/her weight by each leg on a floor. For instance, if the treading force of the left leg is larger than the treading force of the right leg, then it means that the user intends to support his/her weight mainly with his/her right leg. Thus, according to the first invention, the desired lifting share of each leg link is determined by multiplying the treading force of each leg of the user measured by the treading force measuring means by the aforesaid desired assist ratio. This makes it possible to distribute a desired value of a total lifting force to be applied to the user from the seating part (the total sum of the desired lifting shares of the leg links) to the leg links such that it matches a motion state of each leg desired by the user.

Furthermore, according to the first invention, the actuator for the left is controlled such that the lifting force actually imparted to the seating part from the left leg link becomes the desired lifting share of the left leg link determined as described above, and the actuator for the right is controlled such that the lifting force actually imparted to the seating part from the right leg link becomes the desired lifting share of the right leg link determined as described above. Thus, a lifting force corresponding to a force obtained by multiplying the total treading force of the user by the desired assist ratio can be applied to the user from the seating part while dividing the lifting force between the right and left leg links so as to fit the motional state of each leg desired by the user. As a result, a load on each leg of the user can be effectively reduced.

Hence, according to the first invention, it is possible to decrease the force required for a user to support himself/herself with his/her leg or legs on a floor, while using fewer members to be attached to the legs of the user. Moreover, an assisting force (lifting force) for reducing the aforesaid force can be properly shared between the leg links associated with the individual legs of the user.

According to a second invention of the present application, there is provided a control device of a walking assisting device equipped with a seating part that receives a part of the weight of a user sitting thereon from above, a pair of right and left thigh frames respectively joined to the seating part through the intermediary of first joints, a pair of right and left crus frames respectively joined to the thigh frames through the intermediary of second joints, a pair of right and left foot-worn assemblies that are respectively joined to the crus frames through the intermediary of third joints and respectively attached to the feet of the right and left legs of the user, and come in contact with the ground when the legs of the user become standing legs, an actuator for the left for driving a second joint among joints of a left leg link composed of the first joint, the thigh frame, the second joint, the crus frame, the third joint, and the foot-worn assembly on the left side, and an actuator for the right for driving a second joint among joints of a right leg link composed of the first joint, the thigh frame, the second joint, the crus frame, the third joint, and the foot-worn assembly on the right side, the control device including:

a treading force measuring means for measuring the treading force of each leg of the user on the basis of a force detection value indicated by an output of the first force sensor provided in each of the foot-worn assemblies;

a second force sensor provided between the bottom end of the crus frame and the third joint of each leg link or between the third joint and the foot-worn assembly of each leg link;

a force-to-be-controlled measuring means for measuring, as a force-to-be-controlled, a force actually transmitted from the floor to the crus frame of each leg link on the basis of a force detection value indicated by an output of the second force sensor;

a desired assist ratio setting means for setting a desired assist ratio, which is a desired value of a ratio of a force to be supplied by the walking assisting device in a total treading force, which is the total sum of the treading forces of the legs of the user, relative to the total treading force;

a desired lifting share determining means for determining a desired lifting share which is the desired value of a share of a left leg link and a desired lifting share which is the desired value of a share of the right leg link in an upward lifting force to be applied to the user from the seating part by multiplying a treading force of each leg of the user, which has been measured by the treading force measuring means, by the desired assist ratio;

a distributing means for distributing a supporting force required to support, on a floor, the weight obtained by subtracting the total weight of the portions below the second force sensors of the walking assisting device from the total weight of the walking assisting device, or a supporting force required to support the total weight of the walking assisting device on the floor to the leg links on the basis of a ratio between a treading force of the left leg and a treading force of the right leg of the user, which have been measured by the treading force measuring means, thereby determining the share of the left leg link and the share of the right leg link of the supporting force as a desired device supporting force share of each leg link;

a force-to-be-controlled desired value determining means for determining the total sum of a desired lifting share of the left leg link and a desired device supporting force share of the left leg link as a desired value of the force-to-be-controlled of the left leg link and also for determining the total sum of a desired lifting share of the right leg link and a desired device supporting force share of the right leg link as a desired value of the force-to-be-controlled of the right leg link; and an actuator controlling means for controlling the actuator for the left on the basis of the force-to-be-controlled of the left leg link and the desired value of the force-to-be-controlled of the left leg link such that the difference between the force-to-be-controlled and the desired value of the left leg link approximates zero and for controlling the actuator for the right on the basis of the force-to-be-controlled of the right leg link and the desired value of the force-to-be-controlled of the right leg link such that the difference between the force-to-be-controlled and the desired value of the right leg link approximates zero.

According to the second invention, only the foot-worn assembly of the walking assisting device is attached to the foot of each leg of a user, as with the first invention. Moreover, the user has only to sit on the seating part so that a part of his/her weight is rested thereon.

Furthermore, according to the second invention, as with the first invention, the treading force of each leg of the user measured by the treading force measuring means is multiplied by a desired assist ratio set by the desired assist ratio setting means thereby to determine a desired lifting share of the left leg link and a desired lifting share of the right leg link of an upward lifting force to be applied to the user from the seating part.

Meanwhile, according to the second invention, further, a supporting force, which is required to support, on a floor, the weight obtained by subtracting the total weight of the portions below the second force sensors of the walking assisting device from the total weight of the walking assisting device (the weight will be hereinafter referred to as "weight X" in the present column) or a supporting force required to support, on the floor, the total weight of the walking assisting device is distributed to the aforesaid leg links on the basis of a ratio between a treading force of the left leg and a treading force of the right leg of the user measured by the treading force measuring means, thereby determining the share of the left leg link and the share of the right leg link in a desired value of the supporting force as a desired device supporting force share of each leg link. In other words, the desired device supporting force share of each leg link is determined by distributing, to each leg link, the aforesaid supporting force required to support, on a floor, the weight X or the total weight of the aforesaid walking assisting device (this means a force that balances out the gravity corresponding to the weight X or the total weight of the walking assisting device) on the basis of (in conformity with) the ratio between a treading force of the right leg and a treading force of the left leg that reflects a motion of each leg desired by a user. More specifically, for example, a desired device supporting force share of the right leg link may be determined such that the ratio of a desired device supporting force share of the right leg link to the desired value of the supporting force equals the ratio of a right treading force to the total sum of the treading force of the right leg and the treading force of the left leg of the user. Similarly, a desired device supporting force share of the left leg link may be determined such that the ratio of a desired device supporting force share of the left leg link to the desired value of the supporting force equals the ratio of a left treading force to the total sum of the treading force of the right leg and the treading force of the left leg of the user. Supplementally, in general, the weight X and the total weight of the walking assisting device are substantially equal.

Further, according to the second invention, the total sum of the desired lifting share of the left leg link determined by the aforesaid desired lifting share determining means and the desired device supporting force share of the left leg link determined by the aforesaid distributing means is determined as a desired value of the aforesaid force-to-be-controlled of the left leg link, and the total sum of the desired lifting share of the right leg link determined by the aforesaid desired lifting share determining means and the desired device supporting force share of the right leg link determined by the aforesaid distributing means is determined as a desired value of the aforesaid force-to-be-controlled of the right leg link.

Thus, a desired value of a force-to-be-controlled of each leg link is determined to match a ratio between a treading force of the right leg and a treading force of the left leg that reflects a motion of each leg desired by the user. In this case, a desired value of a force-to-be-controlled of each leg link indicates the sum of a desired lifting share of the leg link and a desired device supporting force share, so that the total sum of the desired values of the forces-to-be-controlled of the two leg links corresponds to the total sum of a lifting force to be applied to a user from the seating part and a supporting force for supporting the weight X or the total weight of the walking assisting device.

Further, according to the second invention, the actuator for the left is controlled on the basis of a force-to-be-controlled of the left leg link measured by the force-to-be-controlled measuring means and a desired value of a force-to-be-controlled of the left leg link determined by the force-to-be-controlled desired value determining means such that the difference between the force-to-be-controlled and the desired value of the left leg link approximates zero, and the actuator for the right is controlled on the basis of a force-to-be-controlled of the right leg link measured by the force-to-be-controlled measuring means and a desired value of a force-to-be-controlled of the right leg link determined by the force-to-be-controlled desired value determining means such that the difference between the force-to-be-controlled and the desired value of the right leg link approximates zero.

Thus, an actual force-to-be-controlled of each leg link (this corresponds to an actual share of each leg link relative to a total supporting force for supporting a load actually imparted to the seating part from a user (a force that balances out an upward lifting force actually acting on the user from the seating part) and the gravity that corresponds to the aforesaid weight X or the total weight of the walking assisting device) can be securely controlled to a desired value. Further, at this time, the actual lifting force acting on the user from the seating part can be controlled to a lifting force that corresponds to a force obtained by multiplying a total treading force of the user by the aforesaid desired assist ratio.

Thus, the second invention makes it possible to properly apply a lifting force to the user from the seating part by distributing a lifting force corresponding to a force, which is obtained by multiplying the total treading force of the user by a desired assist ratio, to the right and left leg links so as to match a motion state of each leg desired by a user, while considering the weight of the walking assisting device. As a result, a load on each leg of the user can be further effectively reduced.

Thus, according to the second invention, the force required for a user to support himself/herself with his/her leg or legs on a floor can be reduced, while using fewer members to be attached to each leg of the user, and an assisting force (lifting force) for achieving such a reduction can be properly shared between the leg links associated with the individual legs of the user.

Preferably, in the first invention and the second invention described above, the foot-worn assembly of each leg link is equipped with an annular member for inserting a foot of the user, to which the foot-worn assembly is to be attached, from the toe end thereof, and joined to the third joint of the leg link through the intermediary of the annular member (a third invention).

According to the third invention, the major portion of a load imparted from a user to the seating part and the total weight of the walking assisting device can be applied to a floor through the intermediary of the annular members (more accurately, through the intermediary of the annular member of the foot-worn assembly attached to the foot of the leg that becomes a standing leg) without causing it to act on the user. This enables the user to move each leg, hardly feeling the weight of the walking assisting device.

In the first to the third inventions, the first force sensor of each of the foot-worn assemblies is composed of one or more force sensors provided in each foot-worn assembly such that, when, for example, each leg of the user becomes a standing leg, they are positioned between at least either the location of the metatarsophalangeal joint or the location of the heel of the foot on the bottom surface of the foot of the standing leg and a floor. Further, in this case, the treading force measuring means is preferably a means that takes the total sum of the force detection values indicated by outputs of the force sensors constituting the first force sensor of each foot-worn assembly as the force detection value of the first force sensor and measures the treading force of a leg of the user that has the foot-worn assembly attached thereto on the basis of the force detection value of the total sum (a fourth invention).

With this arrangement, the treading force of each leg can be properly measured. Especially when force sensors are provided at both the location of the metatarsophalangeal joint and the location of the heel of the foot on the bottom surface of the foot of the user (more generally, when a plurality of force sensors including the two force sensors are provided), the treading force of each leg can be properly measured regardless of the posture of each foot of the user relative to a floor.

In the fourth invention, a force sensor may alternatively be provided only at either the location of the metatarsophalangeal joint or the location of the heel. In this case, the first force sensor will be composed of only one force sensor, so that the total sum of the force detection values of force sensors constituting the first force sensor will mean the force detection value itself that is indicated by an output of the one force sensor. Further, in the fourth invention, if each foot portion is provided with an annular member, as with the second invention, then each of the force sensors making up the first force sensor may be placed between the bottom portion of the annular member and the sole of the foot, or at the sole of the foot such that it is located further at the front or the rear relative to the bottom portion of the annular member.

In the third invention described above, a foot supporting member for supporting a foot of the user may be disposed in the annular member of each of the foot-worn assemblies such that it does not come in contact with the annular member, and the foot supporting member may be suspended in the annular member through the intermediary of the first force sensor (a fifth invention). The phrase "the foot supporting member is suspended in the annular member through the intermediary of the first force sensor" means that the foot supporting member is suspended in the annular member through the intermediary of the first force sensor such that no force supporting the foot support member acts from below.

According to the fifth invention, it is possible to apply a force (tensile force) that is as large as a treading force when a leg of the user becomes a standing leg to the first force sensor between the annular member and the foot supporting member. This allows the treading force of the standing leg of the user to be properly measured on the basis of a force detection value indicated by an output of the first force sensor.

The foot supporting member preferably has a plate-shaped portion (sole portion) in contact with substantially the entire bottom surface of the foot of the user. In this case, for example, both ends of an arched member are joined to both sides of the sole and the foot of the user is inserted in the arched member from the toe end, and the outer surface of the arched member is joined to the inner surface of the annular member through the intermediary of the first force sensor. Furthermore, in the fifth invention, the first force sensor may be composed of a single force sensor or it may alternatively be composed of a plurality of force sensors.

In the first to the fifth inventions, preferably, if a force detection value of the first force sensor of each of the foot-worn assemblies is a predetermined first threshold value or less, then the treading force measuring means sets a measurement value of the treading force of the foot attached to the foot-worn assembly to zero (a sixth invention).

This arrangement makes it possible to prevent a leg link having the foot-worn assembly from bearing a lifting force or a weight if a force detection value of the first force sensor is very small, that is, if a user does not wish to cause the leg carrying the foot-worn assembly equipped with the first force sensor to bear the lifting force or the weight. In addition, the influences of minute noises included in force detection values of the first force sensor can be removed.

In the first to the sixth inventions, preferably, if a force detection value of the first force sensor of each of the foot-worn assemblies is a predetermined second threshold value or more, then the treading force measuring means obtains a predetermined upper limit value, which is set beforehand, as the measurement value of a treading force of the foot attached to the foot-worn assembly (a seventh invention).

More specifically, a treading force of each leg of a user grasped from a force detection value of the first force sensor does not smoothly change in general. If the ratio between the treading forces of the two legs frequently changes, then the desired shares of the leg links also frequently change accordingly, often leading to impaired stability of the walking assisting device. For this reason, as in the seventh invention, the measurement values of the treading forces of feet are limited. This makes it possible to prevent a ratio of the treading forces of both legs from frequently changing especially in a period during which both legs of a user become standing legs (so-called "two-leg supporting period"). Thus, the stability of the walking assisting device can be enhanced. The second threshold value in the seventh invention is larger than the first threshold value in the sixth invention. When the sixth invention and the seventh invention are used in combination, if a force detection value of the first force sensor lies between the first threshold value and the second threshold value, then the measurement value of a treading force may be linearly (line shape) changed from zero to the aforesaid upper limit value on the basis of detected values of the first force sensor.

Further, in the second invention, preferably, a selector switch for instructing whether the lifting force control is to be carried out is provided, and if the operation state of the selector switch is an operation state instructing that the lifting force control should be carried out, then the desired lifting share determining means multiplies a treading force of each leg of a user by the desired assist ratio to determine a desired lifting share of the left leg link and a desired lifting share of the right leg link, or if the operation state of the selector switch is an operation state instructing that the lifting force control should not be carried out, then the desired lifting share determining means determines an actual assist ratio of a force actually supplied by the walking assisting device out of a total treading force of the user, the actual assist ratio indicating a ratio relative to the total treading force, by using a force-to-be-controlled of each leg link measured by the force-to-be-controlled measuring means and a treading force of each leg of the user measured by the treading force measuring means, and then uses the determined actual assist ratio in place of the desired assist ratio to determine the desired lifting share of the left leg link and the desired lifting share of the right leg link (an eighth invention).

According to the eighth invention, if the operation state of the selector switch is the operation state instructing not to carry out the lifting force control, then an actual assist ratio of a force actually supplied by the walking assisting device out of a total treading force of the user, the actual assist ratio indicating a ratio relative to the total treading force, is determined on the basis of a treading force of each leg of the user measured by the treading force measuring means and a force-to-be-controlled of each leg link measured by the force-to-be-controlled measuring means, and then the determined actual assist ratio is used in place of the desired assist ratio to determine the desired lifting share of the left leg link and the desired lifting share of the right leg link. In other words, the measured treading force of each leg of the user is multiplied by the actual assist ratio to determine the desired lifting share of each leg link. Hence, an actual assist ratio always coincides with a desired assist ratio. Basically, therefore, a load acting on the seating part from the user and a lifting force acting on the user from the seating part always counterbalance with each other in a balanced state, and the vertical position of the seating part is retained in that state. This enables the user to easily sit on the seating part. To determine an actual assist ratio, specifically, the supporting force required to support the weight X or the total weight of the walking assisting device (a supporting force that balances out the gravity corresponding to the weight X or the total weight) may be subtracted from the total sum of the force-to-be-controlled of each leg link measured on both leg links to determine an actual lifting force from the seating part to the user, and the ratio of the actual lifting force relative to the total sum of the force-to-be-controlled of each leg link of the user that has been measured on both leg links (total treading force) may be determined as the actual assist ratio.

Then, in this state, if the operation state of the selector switch becomes the operation state instructing that the lifting force control be carried out, then a lifting force corresponding to the desired assist ratio that has been set (a lifting force corresponding to a force obtained by multiplying the total treading force of the user by the desired assist ratio) will act on the user from the seating part, thus permitting smooth change to a mode in which a desired lifting force acts on the user. Incidentally, according to the eighth invention, the technical configurations of the third to the seventh inventions described above may be combined.

A ninth invention and a tenth invention of the present invention relate to a control program of a walking assisting device. The ninth invention relates to a control program that causes a computer for controlling a walking assisting device equipped with a seating part that receives from above a part of the weight of a user sitting thereon, a pair of right and left thigh frames respectively joined to the seating part through the intermediary of first joints, a pair of right and left crus frames respectively joined to the thigh frames through the intermediary of second joints, a pair of right and left foot-worn assemblies that are respectively joined to the crus frames through the intermediary of third joints, respectively attached to the feet of the right and left legs of the user, and come in contact with the ground when the legs of the user become standing legs, an actuator for the left for driving a second joint among joints of the left leg link composed of the first joint, the thigh frame, the second joint, the crus frame, the third joint, and the foot-worn assembly on the left side, an actuator for the right for driving a second joint among joints of the right leg link composed of the first joint, the thigh frame, the second joint, the crus frame, the third joint, and the foot-worn assembly on the right side, and a first force sensor provided in each of the foot-worn assemblies for measuring a treading force of each leg of the user, to carry out:

processing for capturing an output of the first force sensor and measuring a treading force to be actually applied by the user to a floor surface from the foot of each of his/her legs on the basis of a force detection value indicated by the output;

processing for capturing a set value of a desired assist ratio, which is a desired value of a ratio of a force to be supplied by the walking assisting device in a total treading force, which is the total sum of the treading forces of the legs of the user, relative to the total treading force, and multiplying the measured treading force of each leg of the user by the set value of the desired assist ratio so as to determine a desired lifting share that is a desired value of a share of the left leg link and a desired lifting share that is a desired value of a share of the right leg link in the upward lifting force to be applied to the user from the seating part; and processing for generating a control output to control the actuator for the left such that the lifting force to be actually imparted to the seating part from the left leg link becomes the desired lifting share of the left leg link that has been determined and also generating a control output to control the actuator for the right such that the lifting force to be actually imparted to the seating part from the right leg link becomes the desired lifting share of the right leg link that has been determined.

According to the control program of the ninth invention, the actuators will be controlled by a computer as in the aforesaid first invention. Thus, a lifting force corresponding to a force obtained by multiplying the total treading force of the user by the desired assist ratio can be applied to the user from the seating part, while dividing the lifting force between the right and left leg links so as to match a motion state of each leg desired by the user. As a result, a load on each leg of the user can be effectively reduced.

Thus, according to the ninth invention, as with the first invention, the force required for a user to support himself/herself with his/her leg or legs on a floor can be reduced, while using fewer members to be attached to each leg of the user, and an assisting force (lifting force) for achieving such a reduction can be properly shared by the leg links associated with the individual legs of the user.

Further, a tenth invention relates to a control program that causes a computer for controlling a walking assisting device equipped with a seating part that receives from above a part of the weight of a user sitting thereon, a pair of right and left thigh frames respectively joined to the seating part through the intermediary of first joints, a pair of right and left crus frames respectively joined to the thigh frames through the intermediary of second joints, a pair of right and left foot-worn assemblies that are respectively joined to the crus frames through the intermediary of third joints, respectively attached to the feet of the right and left legs of the user, and come in contact with the ground when the legs of the user become standing legs, an actuator for the left for driving a second joint among the joints of the left leg link composed of the first joint, the thigh frame, the second joint, the crus frame, the third joint, and the foot-worn assembly on the left side, an actuator for the right for driving a second joint among the joints of the right leg link composed of the first joint, the thigh frame, the second joint, the crus frame, the third joint, and the foot-worn assembly on the right side, a first force sensor provided in each of the foot-worn assemblies for measuring a treading force of each leg of the user, and a second force sensor installed between the lower end portion of the crus frame and the third joint of each leg link or between the third joint and the foot-worn assembly of each leg link to carry out:

processing for capturing an output of the first force sensor and measuring a treading force to be actually applied to a floor surface by the user from the foot of each of his/her legs on the basis of a force detection value indicated by the output;

processing for capturing an output of the second force sensor and measuring, as a force-to-be-controlled, a force to be actually transmitted from the floor to the crus frame of each leg link on the basis of a force detection value indicated by the output;

processing for capturing a set value of a desired assist ratio, which is a desired value of a ratio of a force to be supplied by the walking assisting device in a total treading force, which is the total sum of the treading forces of the legs of the user, relative to the total treading force, and multiplying the measured treading force of each leg of the user by the set value of the desired assist ratio so as to determine a desired lifting share that is a desired value of a share of the left leg link and a desired lifting share that is a desired value of a share of the right leg link in the upward lifting force to be applied to the user from the seating part;

processing for distributing a supporting force required to support, on a floor, the weight obtained by subtracting the total weight of the portions below the second force sensors of the walking assisting device from the total weight of the walking assisting device or a supporting force required to support, on the floor, the total weight of the walking assisting device to the leg links on the basis of a ratio between a treading force of the left leg and a treading force of the right leg of the user, which have been measured, thereby determining a share of the left leg link and a share of the right leg link out of the supporting force as the desired device supporting force shares of the respective leg links;

processing for determining the total sum of the desired lifting share of the left leg link and the desired device supporting force share, which have been determined, as the desired value of the force-to-be-controlled of the left leg link, and also determining the total sum of the desired lifting share of the right leg link and the desired device supporting force share, which have been determined, as the desired value of the force-to-be-controlled of the right leg link; and processing for generating a control output to control the actuator for the left on the basis of the force-to-be-controlled of the left leg link, which has been measured, and a desired value of the force-to-be-controlled of the left leg link, which has been determined, such that the difference between the force-to-be-controlled and the desired value of the left leg link approximates zero and for generating a control output to control an actuator for the right on the basis of a force-to-be-controlled of the right leg link, which has been measured, and a desired value of the force-to-be-controlled of the right leg link, which has been determined, such that the difference between the force-to-be-controlled and the desired value of the right leg link approximates zero.

According to the tenth invention, the actuators will be controlled by a computer, as in the aforesaid second invention. Thus, a lifting force corresponding to a force obtained by multiplying the total treading force of the user by the desired assist ratio can be properly applied to the user from the seating part, while considering the weight of the walking assisting device, by dividing the lifting force between the right and left leg links so as to match a motion state of each leg desired by the user. As a result, a load on each leg of the user can be further effectively reduced.

Thus, according to the tenth invention, as with the second invention, the force required for a user to support himself/herself with his/her leg or legs on a floor can be reduced, while using fewer members to be attached to each leg of the user, and an assisting force (lifting force) for achieving such a reduction can be properly shared by the leg links associated with the individual legs of the user.

In the ninth invention and the tenth invention, the walking assisting device is preferably equipped with annular members, as with the third invention. In this case, as with the fifth invention, the foot supporting member may be provided and the foot supporting member may be suspended in the annular member through the intermediary of the first force sensor. In such a case, the first force sensor may be composed of a single force sensor or it may alternatively be composed of a plurality of force sensors.

In the ninth invention and the tenth inventions, preferably, the first force sensor of each of the foot-worn assemblies is composed of one or more force sensors provided on each foot-worn assembly such that, when each leg of the user becomes a standing leg, they lie between at least at one of the location of the metatarsophalangeal joint and the location of the heel of the foot on the bottom surface of the foot of the standing leg and a floor, and the processing for measuring the treading force is preferably the processing for taking the total sum of the force detection values indicated by outputs of the force sensors constituting the first force sensor of each foot-worn assembly as the force detection value of the first force sensor and measuring the treading force of the leg of the user, to which the foot-worn assembly has been attached, on the basis of the force detection value of the total sum (an eleventh invention).

According to the eleventh invention, the treading forces of the legs can be properly measured, as with the fourth invention described above. Especially when force sensors are provided at both the location of the metatarsophalangeal joint and the location of the heel of the foot on the bottom surface of a foot of the user (more generally, in a case where a plurality of force sensors, including the two force sensor, are provided), the treading force of each leg can be properly measured regardless of the posture of each foot of the user relative to a floor.

Furthermore, in the ninth to the eleventh inventions, the processing for measuring treading forces is preferably the processing for setting the measurement value of a treading force of the foot having the foot-worn assembly attached thereto to zero if a force detection value of the first force sensor of each of the foot-worn assemblies is a predetermined first threshold value or less (a twelfth invention).

According to the twelfth invention, as with the sixth invention, it is possible to prevent a leg link from bearing a lifting force or a weight if a force detection value of the first force sensor is extremely small. In addition, the influences of minute noises included in force detection values of the first force sensor can be removed.

Furthermore, in the ninth to the twelfth inventions, the processing for measuring treading forces is preferably the processing for obtaining a predetermined upper limit value, which is set beforehand, as the measurement value of a treading force of the foot having the foot-worn assembly attached thereto if a force detection value of the first force sensor of each of the foot-worn assemblies is a predetermined second threshold value or more (a thirteenth invention).

With this arrangement, as with the seventh invention, it is possible to prevent the ratio of the treading forces of the two legs from frequently changing especially in a period during which both legs of a user become standing legs (a so-called "two-leg supporting period"). Hence, enhanced stability of the walking assisting device can be achieved. The second threshold value in the thirteenth invention is larger than the first threshold value in the twelfth invention. When the twelfth invention and the thirteenth invention are used in combination, if a force detection value of the first force sensor lies between the first threshold value and the second threshold value, the measurement value of a treading force may be linearly (line shape) changed from zero to the upper limit value according to detected values of the first force sensor.

Furthermore, in the aforesaid tenth invention, preferably, a selector switch for instructing whether or not to carry out the lifting force control is provided in the walking assisting device, and the processing for determining the desired lifting share of each leg link is the processing for multiplying the measured treading force of each leg of the user by the set value of the desired assist ratio to determine a desired lifting share of the left leg link and a desired lifting share of the right leg link in an upward lifting force to be applied to the user from the seating part if the operation state of the selector switch is an operation state instructing to carry out the lifting force control, or for determining an actual assist ratio of a force actually being supplied by the walking assisting device out of a total treading force of the user, the actual assist ratio indicating a ratio relative to the total treading force, by using the measured force-to-be-controlled of each leg link and the measured treading force of each leg of the user, and then determining the desired lifting share of the left leg link and the desired lifting share of the right leg link by using the determined actual assist ratio in place of the desired assist ratio if the operation state of the selector switch is an operation state instructing not to carry out the lifting force control (a fourteenth invention).

With this arrangement, as with the aforesaid eighth invention, when the operation state of the selector switch is the operation state instructing not to carry out the lifting force control, a load acting on the seating part from the user and a lifting force acting on the user from the seating part always counterbalance with each other in a balanced state, thus enabling the user to easily sit on the seating part. Then, in this state, if the operation state of the selector switch changes to the operation state instructing that the lifting force control be carried out, then a lifting force corresponding to the desired assist ratio that has been set will act on the user from the seating part, thus permitting smooth change to a mode in which a desired lifting force acts on the user. Incidentally, according to the fourteenth invention, the technical configurations of the eleventh to the thirteenth inventions described above may be combined.

Supplementally, in the first to the fourteenth inventions explained above, the seating part may be formed of, for example, a part (e.g., a saddle-like part) over which a user rides and sits thereon (the user sits on the seating part, the seating part being positioned at the proximal ends of both legs of the user). In this case, the first joint of each leg link is preferably provided under the seating part. The first joint of each leg link is preferably a joint having a degree of freedom of rotation about at least two axes so that each leg link may perform, for example, adduction/abduction motions and longitudinal swing motions. The second joint of each leg link may be a joint having a degree of freedom of rotation about, for example, a single axis in the lateral direction, or it may be a translatory joint. The third joint of each leg link is preferably a joint having a degree of freedom for rotation about three axes.

BEST MODE FOR CARRYING OUT THE INVENTION

The following will explain a first embodiment of the present invention with reference to the drawings.

First, the construction of a walking assisting device according to the present embodiment will be explained by referring to FIG. 1 to FIG. 3. FIG. 1 is a side view of a walking assisting device 1, FIG. 2 is a sagittal view taken at II in FIG. 1, and FIG. 3 is a sectional view taken at III-III in FIG. 1. The walking assisting device 1 in these FIG. 1 to FIG. 3 is shown in a state wherein it is in operation while being attached to a user A (indicated by virtual lines). In this case, the user A shown in the figures is standing virtually in an upright posture. However, in FIG. 2, the user A takes a posture in which the user's both legs are laterally spread in order to make it easier to see the construction of the walking assisting device 1.

Referring to FIG. 1 and FIG. 2, the walking assisting device 1 is a weight bearing assisting device for supporting a part of the weight of the user A (for making the weight supported by the legs (standing legs) of the user lighter than the weight of himself/herself). The walking assisting device 1 includes a seating part 2 on which the user A sits and a pair of right and left leg links 3R and 3L connected to the seating part 2. The leg links 3L and 3R share the same structure. In FIG. 1, the leg links 3L and 3R are in the same posture and arranged in the lateral direction (in the direction perpendicular to the paper surface of FIG. 1) of the user A, and they overlap in the drawing in this state (the leg link 3L on the left is positioned on the front side of the figure).

In the explanation of the embodiments in the present description, a character "R" will be used to mean the relation to the right leg of the user A or a leg link 3R on the right side of the walking assisting device 1, and a character "L" will be used to mean the relation to the left leg of the user A or a leg link 3L on the left side of the walking assisting device 1. If, however, there is no need to particularly distinguish between right and left, then the characters R and L will be frequently omitted.

The seating part 2 is a saddle-shaped member that enables the user A to stride over the seating part 2 (with the seating part 2 positioned at the proximal ends of both legs of the user A) and sit on the upper surface (seating parting surface) of the seating part 2. When the user A is seated as described above, a part of the weight of the user A is imparted to the seating part 2 from above.

As shown in FIG. 1, a front end 2f and a rear end 2r of the seating part 2 protrude upward, as shown in FIG. 1. This arrangement restricts a seating parting position (a longitudinal position) of the user A relative to the seating part 2 between the front end 2f and the rear end 2r of the seating part 2. The front end 2f of the seating part 2 has a bifurcated shape, as shown in FIG. 2.

Each leg link 3 has a thigh frame 11 connected to the bottom surface of the seating part 2 through the intermediary of a first joint 10, a crus frame 13 connected to the thigh frame 11 through the intermediary of a second joint 12, and a foot-worn assembly 15 connected to the crus frame 13 through the intermediary of a third joint 14.

The first joint 10 of each leg link 3 is a joint corresponding to a hip joint of the user A and it permits a swinging motion of the leg link 3 about a lateral axis (a longitudinal swinging motion of the leg link 3) and a swinging motion thereof about a longitudinal axis (adduction/abduction motions). The first joint 10 is located below the seating part 2. The first joint 10 includes a pair of shaft pins 20f and 20r that are disposed at a location adjacent to the front and at the rear end location of the bottom surface of the seating part 2 and coaxially disposed on a longitudinal axis C indicated by a dashed line in FIG. 1, brackets 21f and 21r rotatively supported by the shaft pins 20f and 20r, respectively, an arc-shaped guide rail 22 fixed to the bottom ends of the brackets 21f and 21r, and a plate 23 movably supported by the guide rail 22 along the guide rail 22. Further, the thigh frame 11 is extended from the plate 23 aslant forward and downward. The thigh frame 11 is an approximately rod-shaped member made integrally with the plate 23.

Both ends (front and rear ends) of each of the shaft pins 20f and 20r are fixed to the seating part 2 through the intermediary of bearings 24f and 24r secured to the bottom surface of the seating part 2. The upper end of the bracket 21f is supported by the shaft pin 20f by being fitted in the outer periphery of the middle portion of the shaft pin 20f. This allows the bracket 21f to freely rotate about the axis C of the shaft pin 20f. Similarly, the upper end of the bracket 21r is supported by the shaft pin 20r by being fitted in the outer periphery of the middle portion of the shaft pin 20r. This allows the bracket 21r to freely rotate about the axis C of the shaft pin 20r. Thus, the guide rail 22 of each first joint 10 swings together with the brackets 21f and 21r, using the axis C of the shaft pins 20f and 20r as the rotational axis. In the present embodiment, the first joints 10R and 10L of the leg links 3R and 3L, respectively, share the same rotational axis C, the shaft pins 20f and 20r being shared by the first joint 10R of the leg link 3R and the first joint 10L of the leg link 3L. More specifically, a bracket 21fR of the right first joint 10R and a bracket 21fL of the left first joint 10L are supported by the same shaft pin 20f. Similarly, a bracket 21rR of the right first joint 10R and a bracket 21rL of the left first joint 10L are supported by the same shaft pin 20r.

The plate 23 of the first joint 10 of each leg link 3 is disposed adjacently to the guide rail 22 and oriented in parallel to a plane that includes the arc of the guide rail 22. A carrier 26 having a plurality of (e.g., four) rotative rollers 25 is secured to the plate 23, as shown in FIG. 1. The same number of the rollers 25 of the carrier 26 engages with the upper surface (inner peripheral surface) and the lower surface (outer peripheral surface), respectively, of the guide rail 22 in such a manner that they are free to roll. This allows the plate 23 to freely move along the guide rail 22. In this case, the positional relationship between the guide rail 22 and the seating part 2 and the radius of the arc of the guide rail 22 are set such that a central point P of the arc of the guide rail 22 is located above the seating part 2 when the walking assisting device 1 is observed in a sagittal plane, as shown in FIG. 1.

The construction of the first joint 10 explained above allows the thigh frame 11 made integral with the plate 23 to swing about the longitudinal rotational axis C of the user A. This swing motion permits the adduction/abduction motions of each of the leg links 3. The thigh frame 11 made integral with the plate 23 is free to swing about the lateral axis passing the central point P (more accurately, about the axis that is perpendicular to the plane that includes the arc of the guide rail 22 and that passes the central point P). This swing motion allows the leg links 3 to swing back and forth. In the present embodiment, the first joint 10 is a joint that permits rotational motions about two axes, one axis in the longitudinal direction and the other axis in the lateral direction. Alternatively, however, the first joint may be constructed such that it permits rotational motions about a vertical axis (inward and outward turning motions of the leg links 3) in addition to the rotational motions about the two axes, namely, the axis in the longitudinal direction and the axis in the lateral direction (i.e., such that it permits rotational motions about three axes). Alternatively, the first joint may be a joint that permits only the rotational motions about one axis in a lateral direction (a joint that allows each of the leg links 3 to swing back and forth only).

The plate 23 of the first joint 10 of each leg link 3 extends from the location of the carrier 26 toward the rear of the seating part 2 when the walking assisting device 1 is observed in the sagittal plane, as shown in FIG. 1. At the rear end of the plate 23, an electric motor 27 and a rotary encoder 28 serving as a rotation angle detecting means for detecting a rotation angle (a rotation angle from a predetermined reference position) of the rotor of the electric motor 27 are coaxially installed. In the present embodiment, the second joint 12 among the first to the third joints 10, 12, and 14, respectively, of each leg link 3 is driven. The electric motor 27 is an actuator that drives the second joint 12. A rotation angle detected by the rotary encoder 28 is used for measuring a rotation angle (a bend angle) of the second joint 12. An electric motor 27L of the left leg link 3L and an electric motor 27R of the right leg link 3R correspond to the actuator for the left and the actuator for the right, respectively, in the present invention. Each rotary encoder 28 corresponds to the displacement amount sensor in the present invention. Each actuator may be a hydraulic or pneumatic actuator. Further, each actuator may be fixed to, for example, the rear portion of the seating part 2 through the intermediary of an appropriate bracket. Alternatively, each actuator may be attached to the second joint 12 of each leg link 3 to directly drive the second joint 12. The displacement amount sensor may be directly attached to the second joint 12 of each leg link 3. Further alternatively, the displacement amount sensor may be composed of a potentiometer or the like in place of a rotary encoder.

The second joint 12 of each leg link 3 is a joint that corresponds to a knee joint of the user A and enables the leg link 3 to bend and stretch. The second joint 12 connects the lower end of the thigh frame 11 and the upper end of the crus frame 13 through the intermediary of a shaft pin 29 having an axis in the lateral direction (more accurately, an axis in the direction perpendicular to a plane that includes the arc of the guide rail 22). The second joint 12 allows the crus frame 13 to freely and relatively rotate about the axis of the shaft pin 29 with respect to the thigh frame 11. The second joint 12 is provided with a stopper, not shown, for restricting the range in which the crus frame 13 can rotate relative to the thigh frame 11.

The crus frame 13 of each leg link 3 is an approximately rod-shaped member extending aslant downward from the second joint 12 of the leg link 3. More specifically, the crus frame 13 is formed by connecting a lower crus frame 13b, which constitutes a portion adjacent to the third joint 14, and a rod-shaped upper crus frame 13a, which constitutes a portion above the lower crus frame 13b, through the intermediary of a force sensor 30 (corresponding to the second force sensor in the present invention) located therebetween. The lower crus frame 13b is sufficiently shorter than the upper crus frame 13a. Thus, the force sensor 30 is disposed adjacently to the third joint 14. The force sensor 30 is a force sensor called "Kistler Sensor" (registered trademark). More specifically, the force sensor 30 is a three-axis force sensor for detecting the translational forces of three axes (a translational force in the axial direction perpendicular to the surface of the force sensor 30 and the translational forces in two axial directions that are parallel to the surface and that are orthogonal to each other). In the present embodiment, however, only the detection values of the translational forces of two axes out of the translational forces of three axes that are detected are used. Therefore, the force sensor 30 may be composed of a two-axis force sensor adapted to detect translational forces of two axes.

A pulley 31 that is rotatively integral with the crus frame 13 about the shaft pin 29 of the second joint 12 is secured to the upper end of the upper crus frame 13a of the crus frame 13. The ends of a pair of wires 32a and 32b serving as a driving force transmitting means for transmitting a rotational driving force of the electric motor 27 to the pulley 31 are secured to the outer periphery of the pulley 31. These wires 32a and 32b are drawn out in the tangential direction of the pulley 31 from two places opposing the diametral direction of the outer periphery of the pulley 31. The wires 32a and 32b are run through a rubber hose (protective tube of the wires), not shown, which is laid along the thigh frame 11, and connected to a rotational drive shaft (not shown) of the electric motor 27. In this case, the electric motor 27 applies tensions to these wires 32a and 32b such that one of the wires 32a and 32b is rewound by the pulley 31, while the other is drawn out of the pulley 31 when the rotational drive shaft of the electric motor 27 rotates in the forward direction, and one of the wires 32a and 32b is rewound by the pulley 31, while the other is drawn out of the pulley 31 when the rotational drive shaft of the electric motor 27 rotates in the reverse direction. Thus, the rotational driving force of the electric motor 27 is transmitted to the pulley 31 through the intermediary of the wires 32a and 32b such that the pulley 31 is rotationally driven (such that the crus frame 13, to which the pulley 31 is secured, rotates about the axis of the shaft pin 29 of the second joint 12 relative to the thigh frame 11).

The bottom end of the lower crus frame 13b of the crus frame 13 has a bifurcated tip 13bb formed to have a bifurcated shape, as shown in FIG. 3.

The third joint 14 of each leg link 3 is a joint corresponding to an ankle joint of the user A. The third joint 14 is composed of a free joint 33 (refer to FIG. 3) that permits rotations about three axes, as shown in FIG. 3. The free joint 33 is attached to the bifurcated tip 13bb of the lower crus frame 13b of the crus frame 13 to connect the lower end (the bifurcated tip 13bb) of the crus frame 13 and a joining portion 34 on the top of the foot-worn assembly 15. This enables the foot-worn assembly 15 to rotate with three degrees of freedom relative to the crus frame 13. The range of rotation of the foot-worn assembly 15 about a longitudinal axis is restricted by the bifurcated tip 13bb of the crus frame 13.

The foot-worn assembly 15 of each leg link 3 includes a shoe 35 into which a foot of the user A is to be placed and a stirrup-shaped annular member 36 housed in the shoe 35, the annular member 36 having its upper end secured to the joining portion 34. As shown in FIG. 3, the annular member 36 is housed in the shoe 35 such that the flat bottom plate thereof is abutted against the internal bottom surface of the shoe 35 and the curved portion thereof extending to both ends of the bottom plate is abutted against the side wall of the cross section of the shoe 35. Further, a sole insert member 37 made of a rigid plate (not shown in FIG. 1) is inserted in the shoe 35 such that it covers the internal bottom surface of the shoe 35 and the bottom plate of the annular member 36. The joining portion 34 is inserted in the shoe 35 through an opening for inserting a shoelace of the shoe 35.

To put the foot-worn assembly 15 of each leg link 3 on each foot of the user A, the foot of the user A is inserted in the shoe 35 from the top opening of the shoe 35 by passing the toe portion of the foot through the annular member 36 and by placing the sole insert member 37 on the bottom surface of the foot. Then, in this state, the shoelace is tightened up, thus attaching the foot-worn assembly 15 onto the foot.

On the bottom surface of the sole insert member 37 of the foot-worn assembly 15, force sensors 38 and 39 are installed at a location on the front side of the shoe 35 (a location farther to the front than the bottom plate of the annular member 36) and at a location on the rear side thereof (a location farther to the rear than the bottom plate of the annular member 36). The force sensor 38 on the front side is disposed such that it is substantially right below an MP joint (metatarsophalangeal joint) of the foot of the user A wearing the foot-worn assembly 15. The force sensor 39 on the rear side is disposed such that it is substantially right below the heel of the foot. In the present embodiment, these force sensors 38 and 39 are one-axis force sensors for detecting translational forces in a direction perpendicular to the bottom surface (ground contact surface) of the foot-worn assembly 15 (a direction substantially perpendicular to a floor surface in a state wherein a leg or legs of the user A are standing). Hereinafter, the force sensors 38 and 39 will be referred to as the MP sensor 38 and the heel sensor 39, respectively. The MP sensor 38 and the heel sensor 39 constitute the first force sensor in the present invention. The sole insert member 37 does not necessarily have to be a rigid plate; it may alternatively be formed of a soft (flexible) material. If the sole insert member 37 is formed of a soft material, providing the bottom surface thereof with a plurality of first force sensors permits highly accurate detection of a force applied to each portion of the bottom surface of a foot of the user A. Meanwhile, if the sole insert member 37 is formed of a rigid plate, then a treading force of an entire foot of the user A can be easily detected. This makes it possible to reduce the number of the first force sensors installed on the bottom surface of the sole insert member 37.

The above describes the construction of the walking assisting device 1 according to the present embodiment. Supplementally, in a state wherein the foot-worn assembly 15 has been attached to each foot of the user A and the user A sits on the seating part 2 with the walking assisting device 1 in operation (while the second joint 12 is being driven by the electric motor 27), as it will be discussed later, if the user A and the walking assisting device 1 are observed in a frontal plane (observed from the front side of the user A), the thigh frame 11L of the left leg link 3L, for example, extends along the inner surface of the left leg of the user A (see FIG. 2), and the second joint 12L at the bottom end of the thigh frame 11L is positioned on the inner side of the left leg. Although not shown, the upper portion of the crus frame 13L (the upper portion of the upper crus frame 13L) connected to the second joint 12L is formed such that it extends along the inner surface of the left leg of the user A from the second joint 12L when observed in a frontal plane and that the lower portion thereof gradually curves and reaches a point right above the instep of the foot of the left leg in front of the shin of the left leg. The same applies to the right leg link 3R.

When the user A having a typical build stands up in an upright posture, the second joints 12 of the leg links 3 jut out toward the front beyond the legs of the user A, as shown in FIG. 1. More specifically, the lengths of the thigh frame 11 and the crus frame 13 are set such that the sum of the lengths is slightly greater than the dimension of the inseam of a leg of the user A having a typical build. The lengths of the thigh frame 11 and the crus frame 13 set as described above and the stopper of the second joint 12 described above restrain the occurrence of a singular point state in which the thigh frame 11 and the crus frame 13 are aligned or a state in which the thigh frame 11 and the crus frame 13 bend in the opposite direction from that shown in FIG. 1. This restrains the control of the walking assisting device 1 from failing due to the singular point state or the reverse bend state of the leg links 3.

The second joint of each leg link 3 may be a translatory joint.

Although the details will be discussed later, in the walking assisting device 1 constructed as described above, an upward lifting force is applied from the seating part 2 to the user A by generating torques of the second joints 12 by the electric motors 27, with the foot-worn assemblies 15 being attached to the feet of the legs of the user A. At this time, if, for example, both legs of the user A are standing legs (the legs to support the weight of the user A) (in the so-called two-leg supporting period), then the foot-worn assemblies 15, 15 on both feet come in contact with a floor and floor reaction forces act on the respective ground contact surfaces. The floor reaction forces acting on the ground contact surfaces of the foot-worn assemblies 15 are such that the resultant force thereof is a force that balances out the sum of the gravity acting on the user A and the gravity acting on the walking assisting device 1, that is, the force for supporting the total weight of the user A and the walking assisting device 1 on a floor (the translational force, which will be hereinafter referred to as "the total supporting force"). More accurately, when the legs of the user A are in motions together with the leg links 3 of the walking assisting device 1, a force for supporting an inertial force generated by the motions of the user A and the walking assisting device 1 will be added to the total supporting force; however, in the walking assisting device 1 according to the present embodiment, the electric motors 27 (actuators) and the encoders 28 having large weights are disposed in the vicinity of the waist rather than in the vicinity of the knees of the leg links 3. Only the foot-worn assemblies 15 of the leg links 3 are restricted (worn) by the user A, so that the number of members to be attached to the user A is smaller, making the leg links 3 lighter. Thus, an inertial force from a motion of the walking assisting device 1 remains sufficiently small. In the present embodiment, the weight of the user A means the total weight that includes the clothing (anything on the body) and belongings of the user A. The gravity acting on the user A means the gravity corresponding to the total weight of the user A (the product of the total weight and a gravitational acceleration constant).

In this case, in the walking assisting device 1 according to the present embodiment, only the two foot-worn assemblies 15 and 15 are restrained by being attached to the user A. Each foot-worn assembly 15 includes the annular link member 36. Therefore, the gravity acting on the walking assisting device 1 and the load received by the walking assisting device 1 from the user A (a downward translational force) through the intermediary of the seating part 2 hardly act on the user A; instead, they act on a floor surface from the two leg links 3, 3 through the intermediary of the annular link members 36, 36 of the two foot-worn assemblies 15, 15, respectively.

Accordingly, both leg links 3, 3 of the walking assisting device 1 are subjected to a supporting force for supporting the gravity acting on the walking assisting device 1 and a load received by the walking assisting device 1 from the user A through the intermediary of the seating part 2 out of the total supporting force. The supporting force is borne by the walking assisting device 1 through the intermediary of the two leg links 3, 3. Hereinafter, the supporting force borne by the walking assisting device 1 as described above will be referred to as "the borne-by-the-assisting-device supporting force." In other words, the borne-by-the-assisting-device supporting force is a supporting force for supporting the weight of the entire walking assisting device 1 and a weight corresponding to a load received by the seating part 2 from the user A (a part of the weight of the user A) on a floor. If both legs of the user A are standing (if both foot-worn assemblies 15 of the walking assisting device 1 are in contact with the ground), then the borne-by-the-assisting-device supporting force is dividedly borne by the two leg links 3, 3 (a part of the borne-by-the-assisting-device supporting force is borne by one leg link 3 and the rest thereof is borne by the other leg link 3). If only one leg of the user A is standing (if the other leg is free), then all the borne-by-the-assisting-device supporting force is borne by the standing leg link 3. Hereinafter, the supporting force borne by one of the leg links 3 (the supporting force acting on one of the leg links 3) out of the borne-by-the-assisting-device supporting force will be referred to as "the borne-by-the-leg-link supporting force." Further, a supporting force borne by the right leg link 3 will be referred to as "the borne-by-the-right-leg-link supporting force" and a supporting force borne by the left leg link 3 will be referred to as "the borne-by-the-left-leg-link supporting force." The total sum of the borne-by-the-left-leg-link supporting force and the borne-by-the-right-leg-link supporting force coincides with the borne-by-the-assisting-device supporting force.

Meanwhile, a supporting force, which is obtained by subtracting the borne-by-the-assisting-device supporting force from the total supporting force, acts from the floor surface to both legs of the user A, and this supporting force is borne by the user A with his/her legs. Hereinafter, the supporting force borne by the user A will be referred to as "the borne-by-the-user supporting force." In other words, the borne-by-the-user supporting force is a supporting force for supporting the weight, which is obtained by subtracting a weight corresponding to a load to be applied by the user A to the seating part 2 of the walking assisting device 1 from the weight of the user A, on a floor. If both legs of the user A are standing, then the borne-by-the-user supporting force is divided among and borne by both legs of the user A (a part of the borne-by-the-user supporting force is borne by one leg and the remainder of the supporting force is borne by the other leg). If only one leg of the user A is standing, then all the borne-by-the-user supporting force is borne by the one leg. Hereinafter, the supporting force borne by each leg (the supporting force acting on each leg from a floor surface) out of the borne-by-user supporting force will be referred to as "the borne-by-user-leg supporting force," and a supporting force borne by the right leg will be referred to as "the borne-by-user-right-leg supporting force" and a supporting force borne by the left leg will be referred to as "the borne-by-user-left-leg supporting force." The total sum of the borne-by-user-left-leg supporting force and the borne-by-user-right-leg supporting force coincides with the borne-by-user supporting force. The force that the user A applies to push the foot of each leg against a floor surface to support himself/herself is referred to as a treading force of the leg. The treading force of each leg balances out the borne-by-user-leg supporting force.

Supplementally, the force sensor 30 provided in each leg link 3 is located on the third joint 14. Hence, the supporting force, which is obtained by subtracting the supporting force for supporting the weight of the portion below the force sensor 30 (e.g., the foot-worn assembly 15) of the leg link 3 from the leg link supporting force related to the leg link 3, acts on the force sensor 30. Then, the components in three-axis directions (or two-axis directions) of the acting supporting force are detected by the force sensor 30. In other words, the force acting on each force sensor 30 (this corresponds to the force-to-be-controlled in the present invention) corresponds to the share in the leg link 3 provided with the force sensor 30 out of the total supporting force for supporting the weight, which is obtained by subtracting the total sum of the weights of the portions below the force sensors 30 from the weight of the entire walking assisting device 1, and the weight corresponding to a load imparted to the seating part 2 from the user A. Further, the total sum of the supporting forces detected by the two force sensors 30 and 30, respectively, coincides with the total supporting force for supporting the weight, which is obtained by subtracting the total sum of the weights of the portions below the force sensors 30 from the weight of the entire walking assisting device 1, and the weight corresponding to a load imparted to the seating part 2 from the user A (hereinafter, the force sensors 30 will be referred to as "the supporting force sensors 30"). The total sum of the weights of the portions below the supporting force sensors 30 of the walking assisting device 1 is sufficiently small, as compared with the weight of the entire walking assisting device 1. Hence, the supporting force acting on each of the supporting force sensors 30 is substantially equal to the leg link supporting force. Further, each supporting force sensor 30 is provided adjacently to the third joint 14 of the leg link 3 provided with the same. Hence, a supporting force acting on the supporting force sensor 30 is substantially equal to a translational force acting on the crus frame 13 from the third joint 14 of the leg link 3 (the supporting force out of the leg link supporting force that is transmitted from a floor to the crus frame 13 through the intermediary of the third joint 14). Hereinafter, the total sum related to both leg links 3 and 3, that is, the total sum of the supporting forces acting on the supporting force sensors 30 or the translational forces acting on the crus frames 13 from the third joints 14 of the leg links 3 will be referred to as "the total supporting force." Of the total supporting force, the share of each leg link 3 will be referred to as "the total supporting force share."

The total sum of the forces acting on the MP sensor 38L and the heel sensor 39L of the left foot-worn assembly 15L corresponds to the aforesaid borne-by-user-left-leg supporting force (or the treading force of the left leg). Similarly, the total sum of the forces acting on the MP sensor 38R and the heel sensor 39R of the right foot-worn assembly 15R corresponds to the aforesaid borne-by-user-right-leg supporting force (or the treading force of the right leg). In the present embodiment, the MP sensor 38 and the heel sensor 39 use one-axis force sensors; however, they may alternatively use, for example, two-axis force sensors that detect also translational forces in directions substantially parallel to the bottom surface of the shoe 33, or they may use three-axis force sensors. The MP sensor 38 and the heel sensor 39 desirably use sensors capable of detecting translational forces in directions substantially perpendicular at least to the sole of the shoe 33 or a floor surface.

The control device of the walking assisting device 1 constructed as described above will now be explained.

FIG. 4 is a block diagram schematically showing the configuration (hardware configuration) of the control device 50. As shown in the figure, the control device 50 includes an arithmetic processor 51 composed of a microcomputer (a CPU, a RAM, and a ROM) and an input/output circuit (an A/D converter or the like), driver circuits 52R and 52L for the electric motors 27R and 27L, respectively, an assist ratio setting key switch 53 for setting a desired assist ratio, which is a desired value of a ratio relative to the total treading force of the assisting force provided by the walking assisting device 1 in the total treading force of the user A, a lifting control ON/OFF switch 54 for selecting whether or not to generate a lifting force for the user A, a power battery 55, and a power circuit 57 that is connected to the power battery 55 through the intermediary of a power switch 56 (ON/OFF switch) and supplies power from the power battery 55 to the circuits of 51, 52R and 52L of the control device 50 when the power switch 56 is turned ON (closed). The assist ratio setting key switch 53 corresponds to the desired assist ratio setting means in the present invention, and the lifting control ON/OFF switch 54 corresponds to the selector switch in the present invention.

The control device 50 is secured to the rear end of the seating part 2 or the plate 23R or 23L or the like through the intermediary of a bracket (not shown). The assist ratio setting key switch 53, the lifting control ON/OFF switch 54, and the power switch 56 are mounted on the outer surface of the housing (not shown) of the control device 50 so that they are accessible for control. The assist ratio setting key switch 53 is formed of a ten-key switch or a plurality of selector switches to permit direct setting of a desired target value of an assist ratio or selective setting from among a plurality of types of desired values prepared beforehand.

Connected to the control device 50 are the MP sensors 38R, 38L, the heel sensors 39R, 39L, the supporting force sensors 30R, 30L, and the rotary encoders 28R, 28L via connection lines, which are not shown. The output signals of these sensors are supplied to the arithmetic processor 51. The arithmetic processor 51 receives control signals of the assist ratio setting key switch 53 and the lifting control ON/OFF switch 54 (signals indicating the operation states of the switches). Further, the control device 50 is connected to the electric motors 27R, 27L via connection lines, which are not shown, to supply current to the electric motors 27R and 27L from the driver circuits 52R, 52L. The arithmetic processor 51 determines the command values of current (hereinafter referred to as "the instructed current values") for energizing the electric motors 27R, 27L by arithmetic processing (control processing) to be described later. The arithmetic processor 51 controls the driver circuits 52R, 52L on the basis of the instructed current values so as to control the produced torques of the electric motors 27R, 27L.

Output signals (voltage signals) of the MP sensors 38R, 38L, the heel sensors 39R, 39L, and the supporting force sensors 30R, 30L may be amplified by a preamplifier in the vicinity of these sensors and then input to the control device 50. The voltage values of the amplified output signals of the MP sensors 38R, 38L, the heel sensors 39R, 39L, and the supporting force sensors 30R, 30L are subjected to A/D conversion before the amplified output signals are supplied to the arithmetic processor 51.

The arithmetic processor 51 has a functional mean shown in the block diagram of FIG. 5 as its main functional means. The functional means is a function implemented by a program stored in the ROM.

Referring to FIG. 5, the arithmetic processor 51 is provided with a right treading force measurement processing means 60R to which output signals of the MP sensor 38R and the heel sensor 39R of the right leg link 3R are supplied and a left treading force measurement processing means 60L to which output signals of the MP sensor 38L and the heel sensor 39L of the left leg link 3L are supplied. The right treading force measurement processing means 60R is a means for carrying out the processing for measuring the magnitude of a treading force of the right leg of the user A (the magnitude of the borne-by-user-right-leg supporting force) from the voltage values of output signals of the MP sensor 38R and the heel sensor 39R. Similarly, the left treading force measurement processing means 60L is a means for carrying out the processing for measuring the magnitude of a treading force of the left leg of the user A (the magnitude of the borne-by-user-left-leg supporting force) from the voltage values of output signals of the MP sensor 38L and the heel sensor 39L. The treading force measurement processing means 60R and 60L correspond to the treading force measuring means in the present invention.

The arithmetic processor 51 is equipped with a right knee angle measurement processing means 61R and a left knee angle measurement processing means 61L to which output signals (pulse signals) of the rotary encoders 28R and 28L are supplied. These knee angle measurement processing means 61R and 61L are means for measuring the bending angles in the second joints 12 (the displacement amounts of the second joints 12) of the leg links 3 associated therewith. The second joint 12 of each leg link 3 corresponds to the knee joint of the leg link 3, so that the bending angle in the second joint will be hereinafter referred to as the knee angle.

Further, the arithmetic processor 51 is equipped with a right supporting force measurement processing means 62R to which output signals of the supporting force sensor 30R of the right leg link 3R and knee angles of the right leg link 3R measured by the right knee angle measurement processing means 61R are supplied, and a left supporting force measurement processing means 62L to which output signals (output voltages) of the supporting force sensor 30L of the left leg link 3L and knee angles of the left leg link 3L measured by the left knee angle measurement processing means 61L are supplied. The right supporting force measurement processing means 62R is a means that carries out the processing for measuring the supporting force acting on the supporting force sensor 30R out of the right leg link supporting force, i.e., the total supporting force share of the right leg link 3R, on the basis of a received output signal of the supporting force sensor 30R and a measurement value of a knee angle of the right leg link 3R. Similarly, the left supporting force measurement processing means 62L is a means that carries out the processing for measuring the supporting force acting on the supporting force sensor 30L out of the left leg link supporting force, i.e., the total supporting force share of the left leg link 3L, on the basis of a received output signal of the supporting force sensor 30L and a measurement value of a knee angle of the left leg link 3L. These supporting force measurement processing means 62R and 62L correspond to the force-to-be-controlled measuring means in the present invention.

The arithmetic processor 51 is equipped with a right/left desired share determining means 63, which receives the measurement values of the measurement processing means 60R, 60L, 61R, 61L, 62R, and 62L and the control signals of the assist ratio setting key switch 53 and the lifting control ON/OFF switch 54. The right/left desired share determining means 63 is a means that carries out processing for determining a desired value of the total supporting force share (hereinafter referred to simply as the control desired value) of each leg link 3 on the basis of input values. The control desired value corresponds to a desired value of a force-to-be-controlled in the present invention.

Further, the arithmetic processor 51 is equipped with a right feedback manipulated variable determining means 64R that receives a total supporting force share of the right leg link 3R measured by the right supporting force measurement processing means 62R and a control desired value of the right leg link 3R determined by the right/left desired share determining means 63, and a left feedback manipulated variable determining means 64L that receives a total supporting force share of the left leg link 3L measured by the left supporting force measurement processing means 62L and a control desired value of the left leg link 3L determined by the right/left desired share determining means 63, a right feedforward manipulated variable determining means 65R that receives the total supporting force share of the right leg link 3R measured by the right supporting force measurement processing means 62R, the control desired value of the right leg link 3R determined by the right/left desired share determining means 63, and the knee angle of the right leg link 3R measured by the right knee angle measurement processing means 61R, and a left feedforward manipulated variable determining means 65L that receives the total supporting force share of the left leg link 3L measured by the left supporting force measurement processing means 62L, the control desired value of the left leg link 3L determined by the right/left desired share determining means 63, and the knee angle of the left leg link 3L measured by the left knee angle measurement processing means 61L. Each of the feedback manipulated variable determining means 64 is a means for calculating, according to a predetermined feedback control law, a feedback manipulated variable (the feedback component of the instructed current value relative to each electric motor 27) on the basis of a difference between a measurement value of an input total supporting force share and a control desired value such that the difference converges to zero. Each of the feedforward manipulated variable determining means 65 is a means for calculating, according to a predetermined feedforward control law, a feedforward manipulated variable (the feedforward component of the instructed current value relative to each electric motor 27) for adjusting the measurement value of the total supporting force share to a control desired value on the basis of an input measurement value of a total supporting force share, a control desired value, and a measurement value of a knee angle.

In addition, the arithmetic processor 51 is equipped with an addition processing means 66R for determining an instructed current value for the electric motor 27R of the right leg link 3R by adding a feedback manipulated variable calculated by the right feedback manipulated variable determining means 64R and a feedforward manipulated variable calculated by the right feedforward manipulated variable determining means 65R, and an addition processing means 66L for determining an instructed current value for the electric motor 27L of the left leg link 3L by adding a feedback manipulated variable calculated by the left feedback manipulated variable determining means 64L and a feedforward manipulated variable calculated by the left feedforward manipulated variable determining means 65L.

The feedback manipulated variable determining means 64R, 64L, the feedforward manipulated variable determining means 65R, 65L, and the addition processing means 66R, 66L described above correspond to the actuator controlling means in the present invention.

The above is the overview of the arithmetic processing function of the arithmetic processor 51.

The control processing of the control device 50 according to the present embodiment will now be explained. This will include detailed explanation of the processing by the arithmetic processor 51. In the walking assisting device 1 according to the present embodiment, if the power switch 56 is OFF, no driving force will be imparted to the second joints 12 of the leg links 3, thus allowing the joints 10, 12 and 14 to freely move. In this state, the leg links 3 are folded due to their own weights. In this state, each foot-worn assembly 15 is attached to each foot of the user A, then the user A or an attendant lifts the seating part 2 and positions it under the crotch of the user A.

Subsequently, when the power switch 56 is turned ON, power is supplied to the circuits of the control device 50, thus activating the control device 50. As the control device 50 is activated, the arithmetic processor 51 carries out the processing, which will be explained below, at predetermined control processing cycles.

In each control processing cycle, the arithmetic processor 51 first carries out the processing of the treading force measurement processing means 60R and 60L. This processing will be explained with reference to FIG. 6. FIG. 6 is a block diagram showing the flows of the processing by the treading force measurement processing means 60R and 60L. The treading force measurement processing means 60R and 60L share the same algorithm of processing, so that any components related to the left treading force measurement processing means 60L are shown in parentheses in FIG. 6.

As representative processing, the processing of the right treading force measurement processing means 60R will be explained. First, a detection value of the MP sensor 38R (the detection value of a force indicated by an output voltage value of the MP sensor 38R) and a detection value of the heel sensor 39R (the detection value of a force indicated by an output voltage of the heel sensor 39R) of the leg link 3R are passed through low-pass filters in S101 and S102, respectively. The low-pass filters remove high-frequency components, such as noises, from the detection values of the sensors 38R and 39R. The cutoff frequencies of the low-pass filters are set to, for example, 100 Hz.

Subsequently, the outputs of the low-pass filters are added in S103. This provides a provisional measurement value FRF_p_R of the treading force of the right leg of the user A. The provisional measurement value FRF_p_R contains an error component resulting mainly from the tightening of the shoelace of the right foot-worn assembly 15R.

Hence, in the present embodiment, the provisional measurement value FRF_p_R is subjected to conversion processing in S104 so as to obtain a final measurement value FRF_R of the treading force of the right leg of the user A. The conversion processing of S104 is carried out according to the table shown in FIG. 7. More specifically, if FRF_p_R is a predetermined first threshold value FRF1 or less, then the measurement value FRF_R is set to zero. This prevents a very small error component attributable mainly to the tightening of the shoelace of the foot-worn assembly 15R from being obtained as the measurement value FRF_R. If the provisional measurement value FRF_p_R is larger than the first threshold value FRF1 but is a second threshold value FRF2 (>FRF1) or less, then the measurement value FRF_R is linearly increased as the value of FRF_p_R increases. If FRF_p_R exceeds the second threshold value FRF2, then the value of FRF_R is retained at a predetermined upper limit value (the value of FRF_R obtained when FRF_p_R equals the second threshold value FRF2). The reason for setting the upper limit value of FRF_R will be discussed hereinafter.

The above describes the processing of the right treading force measurement processing means 60R. The same processing applies to the left treading force measurement processing means 60L.

The arithmetic processor 51 then carries out in sequence the processing of the knee angle measurement processing means 61R, 61L and the processing of the supporting force measurement processing means 62R, 62L. These processing will be explained below with reference to FIG. 8 and FIG. 9. FIG. 8 is a block diagram showing the flows of the processing of the knee angle measurement processing means 61R, 61L and the processing of the supporting force measurement processing means 62R, 62L. The knee angle measurement processing means 61R and 61L share the same processing algorithm, and the supporting force measurement processing means 62R and 62L also share the same processing algorithm. For this reason, any components related to the left knee angle measurement processing means 61L and the left supporting force measurement processing means 62L are shown in parentheses in FIG. 8.

As representative processing, the processing of the right knee angle measurement processing means 61R and the right supporting force calculating means 62R will be explained. First, the right knee angle measurement processing means 61R carries out the processing in S201 and S202. Thus, a measurement value θ1_R of a knee angle of the right leg link 3R (the bending angle of the leg link 3R in the second joint 12R) is obtained. In S201, a provisional measurement value θ1p_R of a knee angle of the leg link 3R is calculated from an output of the rotary encoder 28R.

Referring now to FIG. 9, in the present embodiment, an angle θ1_R formed by a segment S1 that connects the central point P related to the first joint 10R of the leg link 3R (the point P provides the rotational center of longitudinal swing motions of the thigh frame 11R; the point P will be hereinafter referred to as the longitudinal swing central point P) and the central point of the second joint 12R and a segment S2 that connects the central point of the second joint 12R and the central point of the third joint 14R is measured as the knee angle of the right leg link 3R. The same applies to the knee angle of the left leg link 3L. FIG. 9 schematically shows the construction of the essential section of the leg link 3.

In this case, in S201 mentioned above, the rotational position of the second joint 12R in a state wherein the thigh frame 11R and the crus frame 13R of the leg link 3R hold a predetermined posture relationship (e.g., the posture state shown in FIG. 1), that is, in the state wherein the knee angle θ1_R takes a predetermined value is defined as the reference. A rotational amount from the reference rotational position (the amount of a change in the rotational angle; this is proportional to the rotational amount of the rotor of the electric motor 27R) is measured on the basis of an output signal of the rotary encoder 28R. Then, the value obtained by adding the measured rotational amount of the second joint 12R to the value of a knee angle of the leg link 3R at the aforesaid reference rotational position (this is stored and retained in a memory, which is not shown, beforehand) is determined as the provisional measurement value θ1p_R.

The provisional measurement value θ1p_R sometimes contains a high-frequency noise component. Hence, the θ1p_R is passed through a low-pass filter in S202 to obtain a final measurement value θ1p_R of a knee angle of the leg link 3R.

The above describes the processing by the right knee angle measurement processing means 61R. The same processing applies to the left knee angle measurement processing means 61L.

Supplementally, in the present embodiment, the reason for measuring the angle θ1 formed by the segments S1 and S2 as the knee angle of the leg link 3 is because the measurement value of the angle θ1 is used mainly for the processing of the right/left desired share determining means 63, the details of which will be discussed hereinafter. In this case, in the walking assisting device 1 according to the present embodiment, the angle formed by the axis of the thigh frame 11 of the leg link 3 and the segment S1 is constant. Hence, in each knee angle measurement processing means 61, the angle formed by, for example, the axis of the thigh frame 11 of the leg link 3 and the segment S2 related to the crus frame 13 may be determined beforehand as the knee angle of the leg link 3. The angle θ1 may be determined from the knee angle by the processing by the right/left desired share determining means 63, which will be described later.

After the measurement value θ1_R of the knee angle of the leg link 3R is determined as described above, the processing of the right supporting force measurement processing means 62R is carried out in S203. More specifically, a measurement value Fankle_R of a supporting force acting on the supporting force sensor 30R (that is, the total supporting force share of the leg link 3R) is calculated from the measurement value θ1_R of the knee angle obtained in S202 and the detection values of the supporting force sensor 30R (the detection values of the forces of two axes indicated by the voltage values of output signals of the supporting force sensor 30R). This processing will be explained in detail with reference to FIG. 9.

The supporting force (the total supporting force share) Fankle_R acting on the supporting force sensor 30R of the leg link 3R is substantially equal to the translational force acting on the crus frame 13R from the third joint 14R of the leg link 3R, as described above. Further, in the walking assisting device 1 according to the present embodiment, the direction of the translational force and the direction of Fankle_R are parallel to a segment S3 that connects the central point of the third joint 14 of the leg link 3R and the central point P of the longitudinal swing.

Meanwhile, the supporting force sensor 30R detects a force Fz in a z-axis direction perpendicular to the surface (the upper surface or the lower surface) of the supporting force sensor 30R and a force Fx in an x-axis direction, which is perpendicular to the z-axis and parallel to the surface of the supporting force sensor 30R, as shown in the figure. The x-axis and the z-axis are coordinate axes fixed to the supporting force sensor 30R, and are parallel to a plane that includes the arc of the guide rail 22. At this time, the detected Fz and Fx denote a component in the z-axis direction and a component in the x-axis direction, respectively, of Fankle_R. Accordingly, as illustrated, if the angle formed by Fankle_R and the z-axis is denoted as θk, then Fankle_R can be calculated according to the following expression (1) from the detection values of Fz and Fx and θk.

$$Fankle\_R = Fx \cdot \sin\theta k + Fz \cdot \cos\theta k \qquad (1)$$

The angle θk is determined as follows. If the angle formed by the segment S2 and the segment S3 (=the angle formed by the direction of Fankle and the segment S2) is denoted as θ2, then lengths L1 and L2 of the segments S1 and S2, respectively, in a triangle having the segments S1, S2 and S3 as its three sides take constant values (known values set in advance). Further, the angle θ1 formed by the segments S1 and S2 is the measurement value θ1_R obtained as described above by the right knee angle measurement processing means 61R. Therefore, the angle θ2 is determined by geometric calculation from the lengths L1 and L2 (these values being stored and retained in a memory beforehand) of the segments S1 and S2, respectively, and the measurement value θ1_R of the angle θ1.

Specifically, in the triangle having the segments S1, S2 and S3 as its three sides, the relational expressions of (2) and (3) given below hold. L3 denotes the length of the segment S3.

$$L3^2 = L1^2 + L2^2 - 2 \cdot L1 \cdot L2 \cdot \cos\theta1 \quad (2)$$

$$L1^2 = L2^2 + L3^2 - 2 \cdot L2 \cdot L3 \cdot \cos\theta2 \quad (3)$$

Thus, L3 can be calculated according to expression (2) from the values of L1 and L2 and the measurement value of the angle θ1. Then, the angle θ2 can be calculated according to expression (3) from the calculated value of L3 and the values of L1 and L2.

Further, if the angle formed by the z-axis and the segment S2 is denoted by θ3, then this angle θ3 takes a constant value set beforehand on the basis of the angle at which the supporting force sensor 30 is mounted on the crus frame 13. Then, the value of an angle θk required for the calculation of expression (1) can be determined by subtracting the angle θ2 calculated as described above from the angle θ3 of the constant value (this value being stored and retained in a memory, which is not shown, beforehand).

Thus, in the processing of S203 of the right supporting force measurement processing means 62R in the present embodiment, the measurement value Fankle_R of the total lifting force share of the right leg link 3R can be obtained according to the above expression (1) from θk calculated as described above and the detection values Fx and Fz of the supporting force sensor 30 of the leg link 3R.

This completes the detailed explanation of the processing in S203 of the right supporting force measurement processing means 62R. The same applies to the processing of the left supporting force measurement processing means 62L.

In the present embodiment, the supporting force sensor 30 has used a three-axis force sensor or a two-axis force sensor to obtain the measurement value Fankle of the total supporting force share of each leg link according to the above expression (1). However, even if the supporting force sensor 30 is a one-axis force sensor, it is possible to obtain the measurement value Fankle. For example, if the supporting force sensor 30 uses a sensor that detects only the force Fx in the x-axis direction shown in FIG. 9, then the measurement value Fankle can be determined according to expression (4) given below. Further, if the supporting force sensor 30 uses a sensor that detects only the force Fz in the z-axis direction shown in FIG. 9, then the measurement value Fankle can be determined according to expression (5) given below.

$$Fankle = Fx / \sin\theta k \quad (4)$$

$$Fankle = Fz / \cos\theta k \quad (5)$$

However, using expression (4) or (5) above leads to deteriorated accuracy in the value of Fankle as the value of the angle θk approaches 0 degree or 90 degrees. Therefore, it is desirable to use the above expression (1) to obtain the measurement values of Fankle.

Alternatively, the measurement value Fankle may be obtained by determining the square root of the sum of a square value of Fx and a square value of Fz. In this case, the measurement value θ1 of the knee angle is unnecessary.

Supplementally, the processing by the measurement processing means 60, 61, and 62 explained above does not necessarily have to be carried out in sequence. For instance, the processing of the measurement processing means 60, 61, and 62 may alternatively be carried out in parallel by a time-sharing manner or the like. If, however, θ1 is used in the processing by the supporting force measurement processing means 62R and 62L, then the processing by the knee angle measurement processing means 61R and 61L must be implemented before the processing by the supporting force measurement processing means 62R and 62L.

In the present embodiment, the supporting force sensor 30 (the second force sensor) for measuring the total lifting force share of each leg link 3 is located between the third joint 14 and the crus frame 13 (the upper crus frame 13a to be more accurate). Alternatively, however, the supporting force sensor may be installed between the third joint 14 and the foot-worn assembly 15 (e.g., between the third joint 14 and the joining portion 34 of the foot-worn assembly 15). In this case, the supporting force acting on the crus frame 13 from the third joint 14 can be measured by measuring the rotational angle of the third joint 14 and coordinate-converting the supporting force detected by the supporting force sensor positioned between the third joint 14 and the foot-worn assembly 15.

Subsequently, the arithmetic processor 51 carries out the processing by the right/left desired share determining means 63. This processing will be explained in detail below with reference to FIG. 10. FIG. 10 is a block diagram showing the flow of the processing by the right/left desired share determining means 63.

First, in S301, the measurement value Fankle_R of the total supporting force share of the right leg link 3R and the measurement value Fankle_L of the total supporting force share of the left leg link 3L determined by the supporting force measurement processing means 62 as described above are added. This calculates a total supporting force Fankle_t. This total supporting force Fankle_t corresponds to the measurement value of the total sum on both leg links 3 and 3, namely, the total sum of the supporting forces acting on the supporting force sensors 30 or the translational forces acting on the crus frames 13 from the third joints 14 of the leg links 3. The total supporting force Fankle_t is substantially equal to the borne-by-the-assisting-device supporting force.

Subsequently, an actual assist ratio, which is the ratio of the force actually assisted by the walking assisting device 1 in a total treading force relative to the total treading force, is determined in S302 on the basis of the result obtained by subtracting an assisting device weight supporting force, which will be discussed later, from the above total supporting force Fankle_t, and the total sum of the measurement values FRF_R and FRF_L of the treading forces of the legs obtained by the aforesaid treading force measurement processing means 60, that is, the measurement values (FRF_R+FRF_L) of the total treading force. To be more specific, a supporting force required to support the weight calculated by subtracting the total sum of the weights of portions below the supporting force sensors from the total weight of the walking assisting device 1 (a supporting force that balances out the gravity corresponding to the weight) or a supporting force required to support the total weight of the walking assisting device 1 (a supporting force that balances out the gravity corresponding to the total weight) is defined as the assisting device weight supporting force, and the magnitude of this assisting device weight supporting force is stored and retained in a memory, not shown, beforehand. Then, a value obtained by subtracting the assisting device weight supporting force from the total supporting force Fankle_t (this means an upward lifting force currently acting on the user A from the seating part 2) is divided by the measurement value of the total treading force (FRF_R+FRF_L) to determine the actual assist ratio. In other words, the actual assist ratio is determined by calculation expressed as: Actual assist ratio=(Fankle_t−Assisting device weight supporting force)/(FRF_R+FRF_L).

Subsequently, either the actual assist ratio or the set value of a desired assist ratio set by the assist ratio setting key switch 53 is selectively output in S303 according to a control signal of the lifting control ON/OFF switch 54 (a signal indicating whether the switch 54 is ON or OFF). In this case, according to the present embodiment, the lifting control ON/OFF switch 54 is turned on when the user A wishes to receive a lifting force from the seating part 2. In other conditions, the lifting control ON/OFF switch 54 is set to OFF. In S303, if the lifting control ON/OFF switch 54 is OFF, then the actual assist ratio determined in the above S302 is selected and output. If the lifting control ON/OFF switch 54 is ON, then the aforesaid set value of the desired assist ratio is selected and output.

Subsequently, the output of S303 is passed through a low-pass filter in S304. Thus, a practical desired assist ratio as a desired assist ratio to be actually used is determined. The low-pass filter in S304 functions to prevent a sudden change in the practical desired assist ratio when an output of S303 suddenly changes (e.g., when the set value of the desired assist ratio is changed or when an output of S303 is switched from an actual assist ratio to the set value of the desired assist ratio). This is for eventually avoiding a sudden change in the lifting force acting on the user A from the seating part 2. The cutoff frequency of the low-pass filter is, for example, 0.5 Hz.

Subsequently, in S305, the right desired lifting share, which is the desired value of the share of the right leg link 3R, in the lifting force applied to the user A from the seating part 2 is determined by multiplying the aforesaid practical desired assist ratio by the measurement value FRF_R of the treading force of right leg of the user A determined by the aforesaid right treading force measurement processing means 60R. Similarly, in S306, the left desired lifting share, which is the desired value of the share of the left leg link 3L, in the lifting force applied to the user A from the seating part 2 is determined by multiplying the aforesaid practical desired assist ratio by the measurement value FRF_L of the treading force of left leg of the user A determined by the aforesaid left treading force measurement processing means 60L.

The processing in S301 to S306 corresponds to the desired lifting share determining means in the present invention.

Subsequently, in S307, a distribution ratio, which is a ratio for distributing the aforesaid assisting device weight supporting force to the right and left leg links 3, respectively, is determined on the basis of the magnitude of the measurement value FRF_R of a treading force of the right leg and the magnitude of the measurement value FRF_L of a treading force of the left leg that have been determined by the treading force measurement processing means 60 as described above. This distribution ratio is composed of a right distribution ratio, which is the ratio of allocation to the right leg link 3R, and a left distribution ratio, which is the ratio of allocation to the left leg link 3L, of an assisting device weight supporting force, the sum of the two distribution ratios being 1.

In this case, the right distribution ratio is determined to be the ratio of the magnitude of FRF_R relative to the sum of the magnitude of the measurement value FRF_R and the magnitude of the measurement value FRF_L, that is, FRF_R/(FRF_R+FRF_L). Similarly, the left distribution ratio is determined to be the ratio of the magnitude of FRF_L relative to the sum of the magnitude of the measurement value FRF_R and the magnitude of the measurement value FRF_L, that is, FRF_L/(FRF_R+FRF_L). In this case, in a state wherein one of the legs of the user A is a standing leg, while the other leg is a free leg (that is, in a one-leg standing state), the distribution ratio for the leg which becomes a free leg is zero. Further, the distribution ratio for the leg which becomes a standing leg is 1.

The following will explain the reason for setting an upper limit value of the measurement value FRF of a treading force of each leg in the conversion processing in S104 (see FIG. 6) of each of the aforesaid treading force measurement processing means 60. In a state wherein both legs of the user A are standing (i.e., the state in a two-leg supporting period), the provisional measurement value FRF_p of a treading force of each leg usually tends to frequently fluctuate rather than smoothly changes. In such a case, if the right and left distribution ratios were determined on the basis of the provisional measurement value FRF_p, then the distribution ratio would frequently change and the allocation ratio of each leg link 3 of a desired total supporting force would be apt to change. As a result, a minute change would easily take place in a lifting force acting on the user A from the seating part 2. This may consequently cause the user A to feel uncomfortable. For this reason, according to the present embodiment, an upper limit value of the measurement value FRF of a treading force of each leg has been set to prevent a situation in which frequent changes take place in the right and left distribution ratios in the state of a two-leg supporting period. In this case, in the state of a two-leg supporting period, both the right and left distribution ratios will be basically maintained at ½ except for a period immediately after the start and a period immediately before the end, thus stabilizing the right and left distribution ratios.

In FIG. 7 mentioned above, the measurement value FRF_R (L) may be obtained according to the table which has only the threshold value FRF1 and in which the measurement value FRF_R(L) of a treading force linearly increases if the provisional measurement value FRF_p_R(L) of a treading force of each leg of the user A is the threshold value FRF1 or more. The threshold values FRF1, FRF2 and the like of the table for obtaining FRF_R(L) from the provisional measurement value FRF_p may be appropriately determined on the basis of the lifting force that feels comfortable to the user A, the weight of the walking assisting device 1, the calculation capability of the control device 50, and the like.

Returning to the explanation of FIG. 10, subsequently, in S308, the right desired device supporting force share, which is the desired value of the share of the right leg link 3R, in an assisting device weight supporting force is determined by multiplying the aforesaid assisting device weight supporting force by the right distribution ratio determined in S307. Similarly, in S311, the left desired device supporting force share, which is the desired value of the share of the left leg link 3L, in an assisting device weight supporting force is determined by multiplying the aforesaid assisting device weight supporting force by the left distribution ratio determined in S307. The processing in S307, S308, and S311 may be implemented in parallel to the processing of S301 to S306.

Subsequently, the processing in S309 and S310 related to the right leg link 3R and the processing in S312 and S313 related to the left leg link 3L are carried out. According to the processing in S309 and S310 related to the right leg link 3R, first, in S309, the right desired device supporting force share obtained in S308 is added to the right desired lifting share obtained in the aforesaid S305. Thus, a provisional control desired value Tp_Fankle_R as the provisional value of the aforesaid control desired value of the right leg link 3R is determined. Then, the provisional desired value Tp_Fankle_R is passed through a low-pass filter in S310 so as to determine the final control desired value T_Fankle_R of the right leg link 3R. The low-pass filter in S309 functions to remove noise components caused by a change in the knee angle θ1 or the like. The cutoff frequency of the low-pass filter is, for example, 15 Hz.

Similarly, according to the processing in S312 and S313 related to the left leg link 3L, first, in S312, the left desired device supporting force share obtained in S311 is added to the left desired lifting share obtained in the aforesaid S306. Thus, a provisional control desired value Tp_Fankle_L as the provisional value of the aforesaid control desired value of the left leg link 3L is determined. Then, the provisional desired value Tp_Fankle_L is passed through a low-pass filter in S313 so as to determine the final control desired value T_Fankle_L of the left leg link 3L.

The control desired value of each of the leg links 3 determined as described above means the desired value of the share of each of the leg links 3 in the total sum of the aforesaid assisting device weight supporting force and the total lifting force applied to the user A from the seating part 2 (i.e., the aforesaid total supporting force).

The above is the processing by the right/left desired share determining means 63. Supplementally, the processing for calculating the right and left desired lifting shares in S305 and S306 is equivalent to distributing the result obtained by multiplying the total sum of the measurement values FRF_R and FRF_L of the treading forces of the right and left legs of the user A by the aforesaid practical desired assist ratio (this corresponds to the desired value of the total lifting force applied to the user A from the seating part 2) to the right and left leg links 3 on the basis of the aforesaid right distribution ratio and left distribution ratio.

The processing in S307, S308, and S311 corresponds to the distributing means in the present invention. Further, the processing in S309, S310, S312, and S313 corresponds to the means for determining a desired value of a force-to-be-controlled in the present invention.

After carrying out the processing by the right/left desired share determining means 63 as described above, the arithmetic processor 51 implements the processing of the feedback manipulated variable determining means 64R, 64L and the feedforward manipulated variable determining means 65R, 65L in sequence or in parallel.

The processing of the feedback manipulated variable determining means 64R, 64L will be explained with reference to FIG. 11. FIG. 11 is a block diagram showing the flows of the processing of the feedback manipulated variable determining means 64R, 64L. The feedback manipulated variable determining means 64R, 64L share the same algorithm, so that any components related to the left feedback manipulated variable determining means 64L are shown in parentheses in FIG. 11.

The processing of the right feedback manipulated variable determining means 64R will be representatively explained. First, a difference between a control desired value T_Fankle_R of the right leg link 3R determined by the right/left desired share determining means 63 and a measurement value Fankle_R of the total supporting force share of the right leg link 3R measured by the right supporting force measurement processing means 62 (T_Fankle_R−Fankle_R) is calculated in S401. Then, the difference is multiplied by gains Kp and Kd in S402 and S403, respectively. Further, the calculation result of S403 is differentiated in S404 ("s" in the figure denoting a differential operator), and the differential value and the calculation result of S402 are added in S405. Thus, a manipulated variable Ifb_R of the current of the right electric motor 27 is calculated according to the PD control law, which serves as the feedback control law, such that a manipulated variable Ifb_R of the current of the right electric motor 27 converges the difference (T_Fankle_R−Fankle_R) to zero. The manipulated variable Ifb_R means a feedback component of an instructed current value of the right electric motor 27.

In this case, according to the present embodiment, the values of the gains Kp and Kd are variably set on the basis of the measurement value θ1_R of a knee angle of the leg link 3R. This is because the sensitivity of the electric motor 27R to changes in the lifting force of the seating part 2 in response to changes in current (changes in torque) of the electric motor 27R varies according to the knee angle of the leg link 3R. In this case, as the knee angle θ1_R increases (as the leg link 3R stretches), the sensitivity of the electric motor 27R to the changes in the lifting force of the seating part 2 in response to changes in current (changes in torque) increases. Hence, in S406, the values of the gains Kp and Kd are basically set such that the values of the gains Kp and Kd are reduced as the measurement value θ1_R of the knee angle of the leg link 3R increases according to a data table, which is not shown.

The above explains the processing of the right feedback manipulated variable determining means 64R. The same applies to the processing of the left feedback manipulated variable determining means 64L. In the present embodiment, the PD control law is used as the feedback control law so as to permit quick and stable control of lifting forces. Alternatively, however, a feedback control law other than the PD control law may be used.

Referring now to FIG. 12, the processing by the feedforward manipulated variable determining means 65R and 65L will be explained. FIG. 12 is a block diagram showing the flows of the processing of the feedforward manipulated variable determining means 65R and 65L. The feedforward manipulated variable determining means 65R and 65L share the same algorithm, so that any components related to the left feedforward manipulated variable determining means 65L are shown in parentheses in FIG. 12.

The processing of the right feedforward manipulated variable determining means 65R will be representatively explained. In S501, the measurement value θ1_R of the knee angle of the leg link 3R measured by the knee angle measurement processing means 61R is differentiated to calculate an angular velocity ω1_R of a bending angle of the second joint 12 of the leg link 3R. Further, in S502, the measurement value θ1_R of the knee angle of the leg link 3R and the measurement value Fankle_R of the total supporting force share of the leg link 3R measured by the supporting force measurement processing means 62R are used to calculate an actual tension T1, which is an actual tension of the wires 32a and 32b of the leg link 3R. The processing for calculating the actual tension T1 will be explained with reference to FIG. 13. In FIG. 13, the leg links 3 are schematically shown. Further, in FIG. 13, like elements as those in FIG. 9 are assigned like reference numerals.

First, a component Fankle_a that is orthogonal to the segment S2 of the measurement value Fankle_R of a total supporting force share of the leg link 3R is calculated according to the following expression (7).

$$Fankle\_a = Fankle\_R \cdot \sin\theta 2 \tag{7}$$

The angle θ2 is an angle formed by Fankle_R and the segment S2, and the θ2 is calculated by geometric calculation using the measurement value θ1_R, as explained above with reference to FIG. 9 (refer to expressions (2) and (3) given above).

Then, the Fankle_a determined as described above is multiplied by a length L2 of the segment S2, as shown in the following expression (8). Thus, based on Fankle_R, a moment M1 generated in the second joint 12 (knee joint) is calculated.

$$M1 = Fankle\_a \cdot L2 \tag{8}$$

The moment generated in the pulley 31 by the actual tension T1 of the wires 32a and 32b balances out the moment M1 in a steady state. Further, the moment M1 is divided by an effective radius r of the pulley 31 according to the following expression (9) so as to calculate the actual tension T1 of the wires 32a and 32b.

$$T1 = M1/r \tag{9}$$

The above is the detailed explanation of the processing in S502.

Returning to the explanation of FIG. 12, further, a desired tension T2 of the wires 32a and 32b of the leg link 3R is calculated in S503. The desired tension T2 is a tension to be produced in the wires 32a and 32b on the basis of a control desired value (the desired value of a total supporting force share) of the leg link 3R determined in the processing by the right/left desired share determining means 63. The desired tension T2 is calculated in the same manner as in the calculation processing in S502. More specifically, a component orthogonal to the segment S2 of the control desired value T_Fankle_R (refer to FIG. 13) is calculated according to an expression in which Fankle_R in the right side of the above expression (7) has been replaced by the control desired value T_Fankle_R of the leg link 3R determined in the processing by the right/left desired share determining means 63. Then, the calculated component is used to replace Fankle_a in the right side of the above expression (8) so as to calculate a desired moment of the second joint 12 of the leg link 3R. Further, the desired moment is used to replace M1 in the right side of the above expression (9) to obtain the desired tension T2 of the wires 32a and 32b.

The above explains the processing in S503.

After the processing in S501 to S503 is carried out, a manipulated variable of current of the electric motor 27R Iff_R is determined in S504 by predetermined feedforward processing by using the angular velocity ω1_R of the second joint 12, the actual tension T1 of the wires 32a and 32b, and the desired tension T2 calculated as described above. The manipulated variable Iff_R means a feedforward component of an instructed current value of the electric motor 27R.

In the processing of S504, the manipulated variable Iff_R is calculated according to a model expression represented by the following expression (10).

$$Iff\_R = B1 \cdot T2 + B2 \cdot \omega 1\_R + B3 \cdot sgn(\omega 1\_R) \tag{10}$$

where B2=b0+b1·T1, B3=d0+d1·T1

In expression (10), B1 denotes the coefficient of a constant, and B2 and B3 denote the coefficients represented by linear functions of the actual tension T1, as indicated by the note on expression (10). Further, b0, b1, d0, and d1 denote constants, and sgn( ) denotes a sign function.

This expression (10) is a model expression representing the relationship among the current of the electric motor 27, the tension of the wires 32a and 32b, and the angular velocity ω1 of the second joint 12. A first term of the right side of expression (10) means the proportional term of tension, a second term means the term based on the viscous frictional force between the wires 32a, 32b and the pulley 31, and a third term means a term based on a dynamic frictional force between the wires 32a, 32b and the pulley 31. A term based on angular acceleration of the second joint 12 (i.e., a term based on an inertial force) may be further added to the right side of expression (10).

Supplementally, the constants B1, b0, b1, d0, and d1 used for the calculation of expression (10) are experimentally identified by an identification algorithm that minimizes the square value of the difference between a value of the left side and a value of the right side of expression (10) beforehand. Then, the identified constants B1, b0, b1, d0, and d1 are stored and retained in a memory, not shown, and used when the walking assisting device 1 is operated.

This completes the explanation of the processing of the right feedforward manipulated variable determining means 65R. The same applies to the processing of the left feedforward manipulated variable determining means 65L.

Referring to FIG. 5, after calculating the manipulated variables Ifb_R and Iff_R of the current of the electric motor 27R and the manipulated variables Ifb_L and Iff_L of the current of the electric motor 27L as described above, the arithmetic processor 51 adds the manipulated variables Ifb_R and Iff_R by the addition processing means 66R. Thus, the instructed current value of the electric motor 27R is determined. Further, the arithmetic processor 51 adds the manipulated variables Ifb_L and Iff_L by the addition processing means 66L. Thus, the instructed current value of the electric motor 27L is determined. Then, the arithmetic processor 51 outputs these instructed current values to the driver circuits 52 associated with the individual electric motors 27. At this time, the driver circuit 52 energizes the electric motors 27 on the basis of the supplied instructed current values.

The control processing of the arithmetic processor 51 explained above is carried out at predetermined control cycles. Thus, the torque to be generated in the electric motors 27 and eventually the driving force of the second joint 12 (the knee joint) of the leg link 3 are controlled such that the measurement value Fankle of an actual total supporting force share of each leg link 3 agrees with (converges to) the control desired value T_Fankle corresponding to the leg link 3.

In the embodiment explained above, the desired value of a total desired lifting force to be applied to the user A from the seating part 2 is distributed to the left and right leg links 3L and 3R on the basis of the ratio of the treading force of the right leg and the treading force of the left leg of the user A, and the assisting device weight supporting force for supporting the total weight of the walking assisting device 1 is distributed to the left and right leg links 3L and 3R on the basis of the ratio of the treading force of the right leg and the treading force of the left leg of the user A. Then, the control desired value, which is the desired value of the total supporting force share of the leg links 3 is determined, and the supporting force of the control desired value is generated in the leg links 3. Therefore, especially in a state wherein the lifting control ON/OFF switch 54 is ON, a lifting force corresponding to an assist ratio set using the key switch 53 can be applied smoothly and stably to the user A from the seating part 2, thus making it possible to effectively reduce a load on the legs of the user A.

Further, in a state wherein the lifting control ON/OFF switch 54 is OFF, the aforesaid actual assist ratio is determined as a practical desired assist ratio. Thus, in this state, a load from the user A onto the seating part 2 always balances out a lifting force applied from the seating part 2 to the user A. In the balanced state, a vertical position of the seating part 2 can be retained. In this state, when the lifting control ON/OFF switch 54 is turned ON, a lifting force can be smoothly applied to the user A, obviating a situation wherein a sudden lifting force is applied to the user A from the seating part 2.

Moreover, the current instructed values of the electric motors 27 are determined according to the PD control law (the feedback control law) and the feedforward control law in combination, thus permitting prompt and stable lifting force control.

In the embodiment described above, the first force sensors have been composed of the MP sensor 38 and the heel sensor 39, these sensors 38 and 39 being provided in the foot-worn assemblies 15 such that they are located between the sole of the foot of a standing leg of the user A and a floor, as shown in aforesaid FIG. 3. However, the mounting position of the first force sensor is not limited thereto. The first force sensor may alternatively be provided in the foot-worn assembly as shown in, for example, FIG. 14. This case will be explained below as a second embodiment.

Referring to FIG. 14, in the second embodiment, a foot supporting member 100 is provided inside the annular member 36 of a foot-worn assembly 15. The foot supporting member 100 shaped like a slipper is composed of a plate-like foot sole member 101 (a member like a sole insert of a shoe), which comes in contact with substantially the entire bottom surface of a foot of a user A, and an arched member 102 (a member having an approximately semicircular arc-shaped section) connected to the foot sole member 101. The arched member 102 has its both lower ends connected integrally with both sides of the foot sole member 101. The toe portion of a foot of the user A can be inserted in the arched member 102. With the toe portion inserted therein, the foot is supported on the foot sole member 101. These foot sole member 101 and the arched member 102 are formed of a material, such as a metal or resin, having a predetermined rigidity.

Further, a tensile strength sensor 103 constituting a first force sensor is provided between the outer surface of the top of the arched member 102 and the inner surface of the top of the annular member 36. The tensile strength sensor 103 is connected to the arched member 102 and the annular member 36. The tensile strength sensor 103 is formed of, for example, a tensile load cell. In this case, the foot supporting member 100 is disposed inside the annular member 36 such that it is in contact with neither the annular member 36 nor a shoe 35. With this arrangement, the foot supporting member 100 is suspended in the annular member 36 through the intermediary of the tensile strength sensor 103 so that a force for supporting the foot supporting member 100 from under acts from neither the annular member 36 nor the shoe 35.

A cushion member for protecting a foot of the user A may be provided on the upper surface of the foot sole member 101 or the inner surface of the arched member 102.

This completes the explanation of the construction of the foot-worn assembly 15 in the present embodiment. The foot-worn assembly 15 in the present embodiment is not equipped with the MP sensor 38, the heel sensor 39, and the sole insert 37. To attach the foot-worn assembly 15 of the present embodiment to each foot of the user A, the toe portion of the foot is inserted in the arched member 102 of the foot supporting member 100, and the foot is inserted into the shoe 35 through the top opening of the shoe 35, placing the foot on the foot sole member 101.

In the walking assisting device according to the present embodiment that has the foot-worn assembly 15 constructed as described above, the treading force of a leg of the user A that becomes a standing leg will be detected by the tensile strength sensor 103 as a tensile strength acting on the tensile strength sensor 103.

Further, in the present embodiment, outputs of the tensile strength sensors 103 of the right and left foot-worn assemblies 15 instead of outputs of the MP sensor 38 and the heel sensor 39 are supplied to treading force measurement processing means 60 of an arithmetic processor 51. Each of the treading force measurement processing means 60 obtains a force detection value, which is represented by an output of the tensile strength sensor 103 associated therewith (the tensile strength taking a positive value) and which has been passed through a low-pass filter, as a provisional measurement value FRF_p of each leg of the user A. Further, each treading force measurement processing means 60 determines the measurement value FRF of a treading force according to the table shown in the aforesaid FIG. 7 from the provisional measurement value FRF_p.

The construction and processing other than those explained above are the same as those of the aforesaid first embodiment.

The present embodiment is also capable of providing advantages similar to those of the first embodiment described above. In the present embodiment, the tensile strength sensor 103 is provided between the uppermost portion of the inner peripheral surface of the annular member 36 and the uppermost portion of the outer peripheral surface of the arched member 102. However, the position where the tensile strength sensor 103 is disposed is not limited thereto; it may alternatively be installed on the upper, diagonal portion or on a side surface of the arched member 102 so that it is provided between the arched member 102 and the annular member 36. Further alternatively, two or more tensile strength sensors may be provided between the arched member 102 and the annular member 36, and the foot supporting member 100 may be suspended in the annular member 36 through the intermediary of the plurality of tensile strength sensors. In this case, a treading force may be measured on the basis of the total sum of the force detection values indicated by outputs of the tensile strength sensors, as with the first embodiment in which a treading force has been measured on the basis of the total sum of the force detection values of the MP sensor 38 and the heel sensor 39.

INDUSTRIAL APPLICABILITY

As described above, the present invention is useful as the one capable of properly assisting a user with his/her walking.

Figure 1:
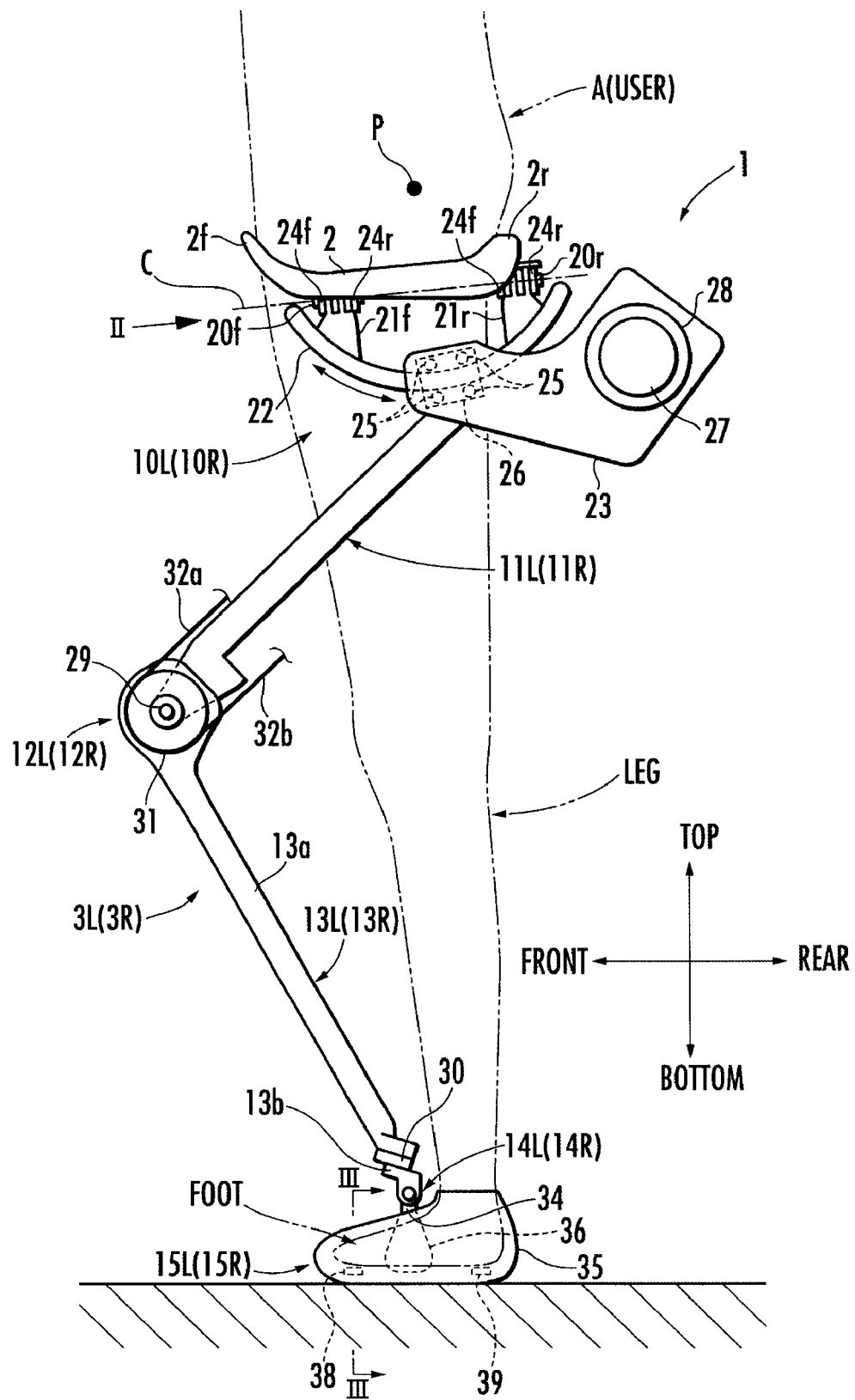
FIG. 1 is a side view (a view observed in a sagittal plane) of a walking assisting device to which a first embodiment of the present invention has been applied.
Figure 2:
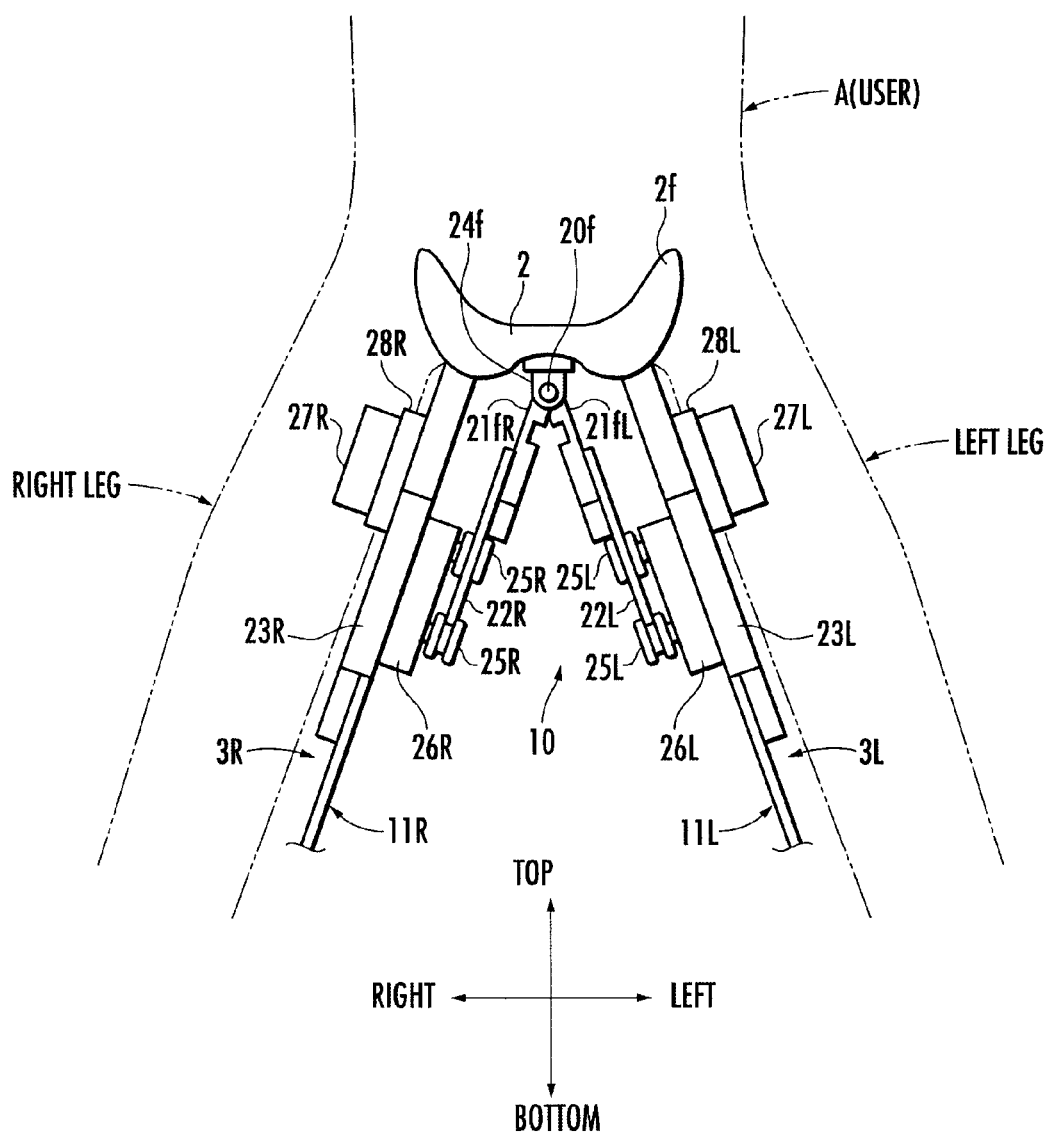
FIG. 2 is a sagittal view taken at II in FIG. 1.
Figure 3:
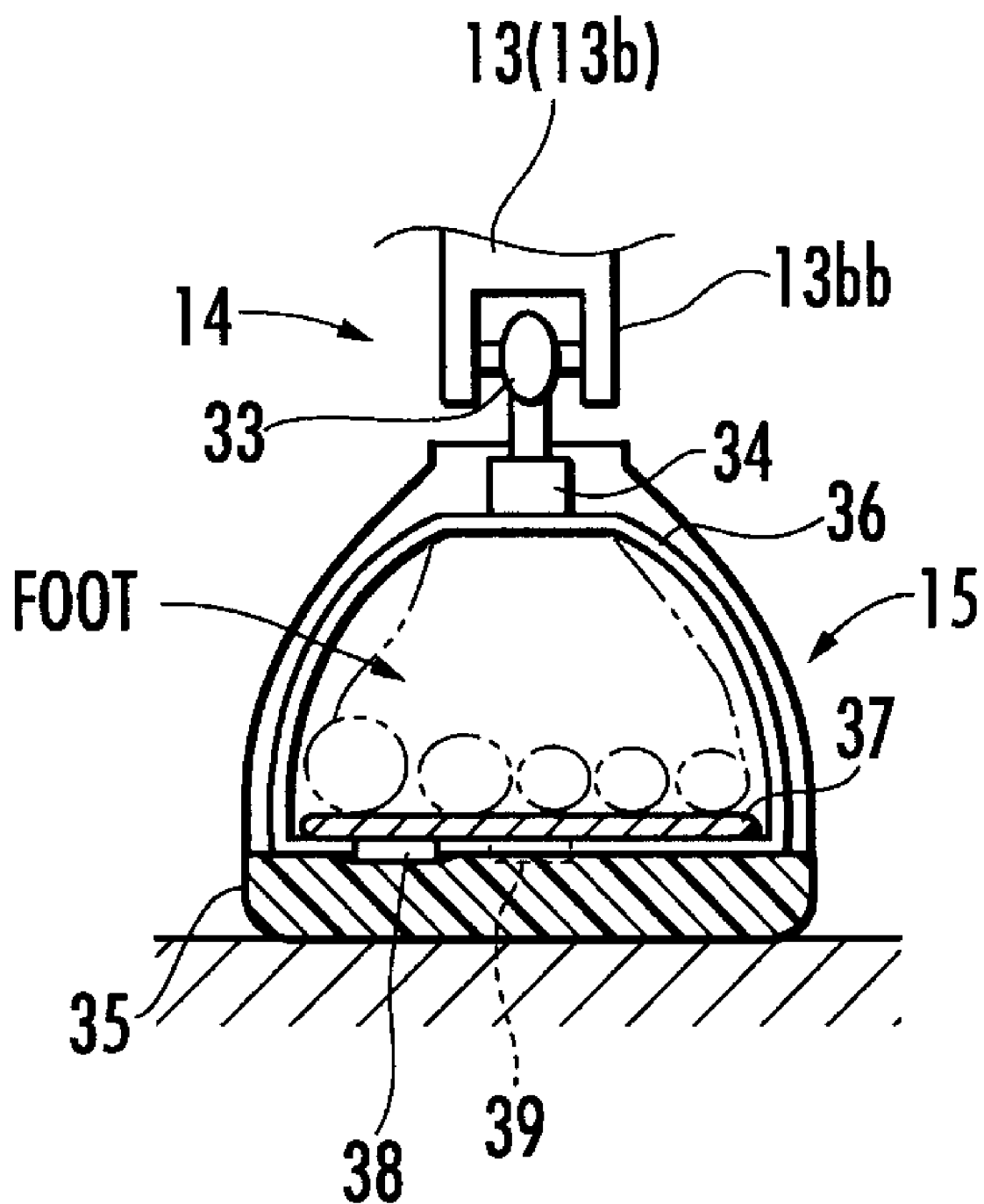
FIG. 3 is a sectional view taken at III-III in FIG. 1.
Figure 4:
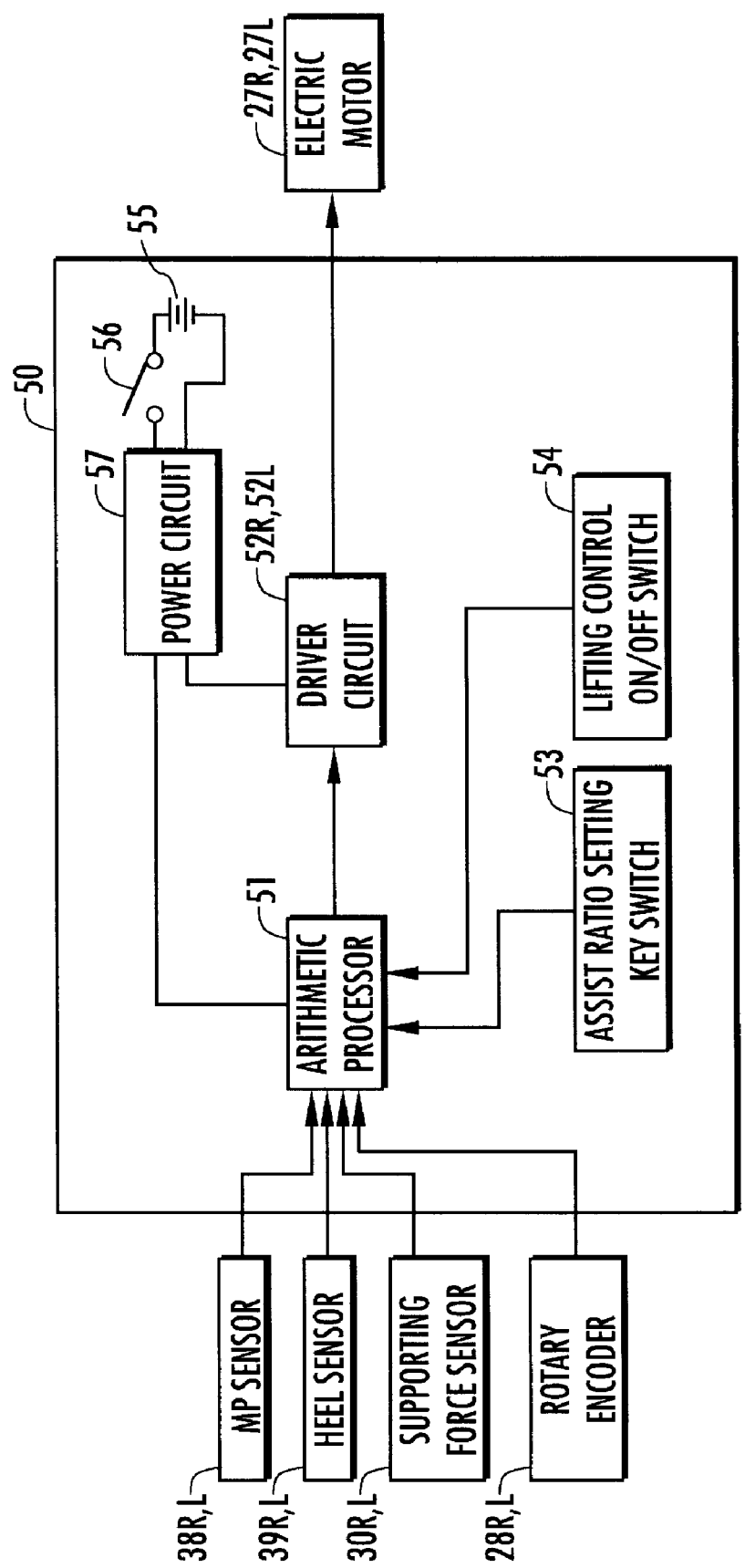
FIG. 4 is a block diagram schematically showing the construction (hardware construction) of a control device of the walking assisting device in FIG. 1.
Figure 5:
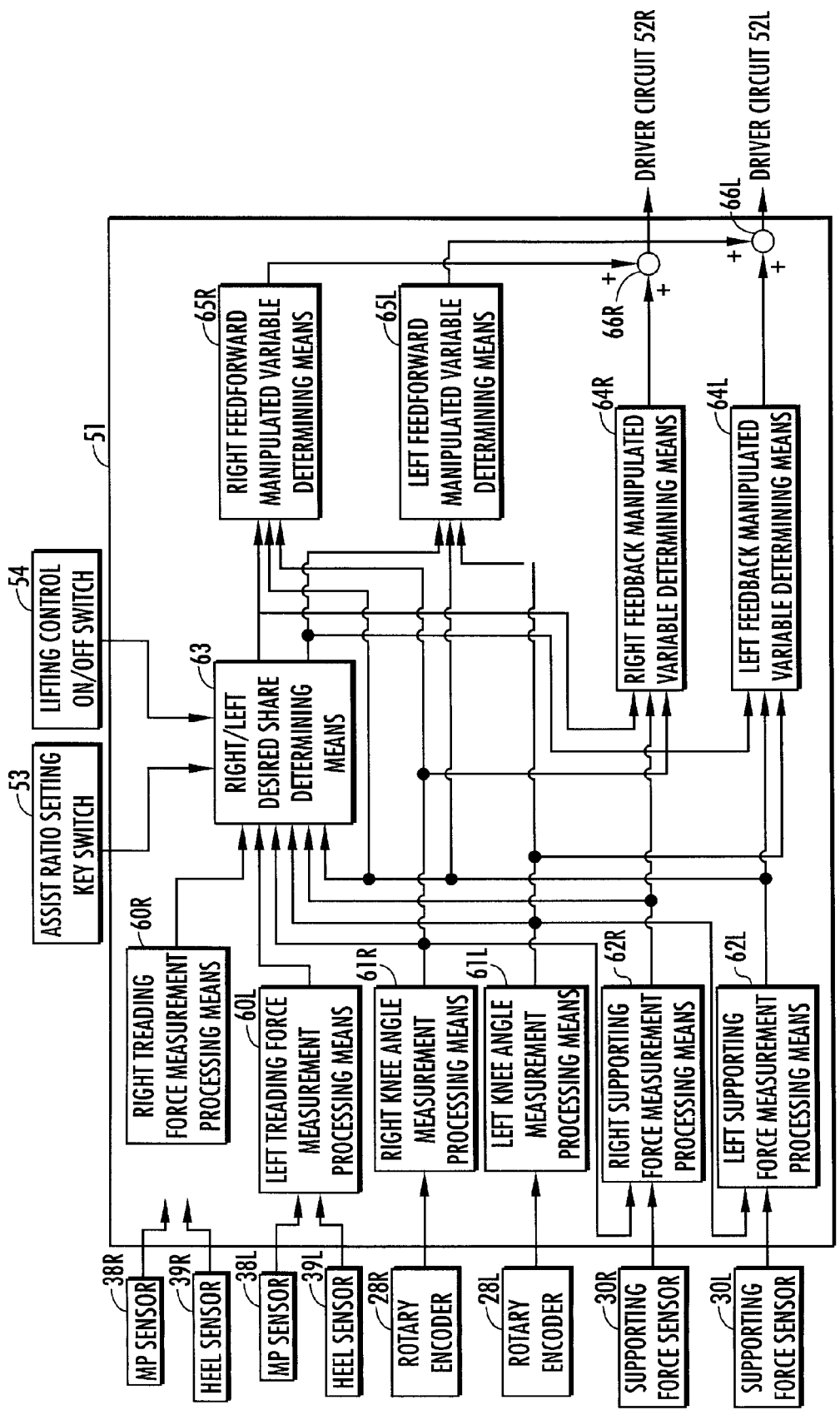
FIG. 5 is a block diagram showing the functional construction of an arithmetic processor 51 provided in the control device in FIG. 4.
Figure 6:
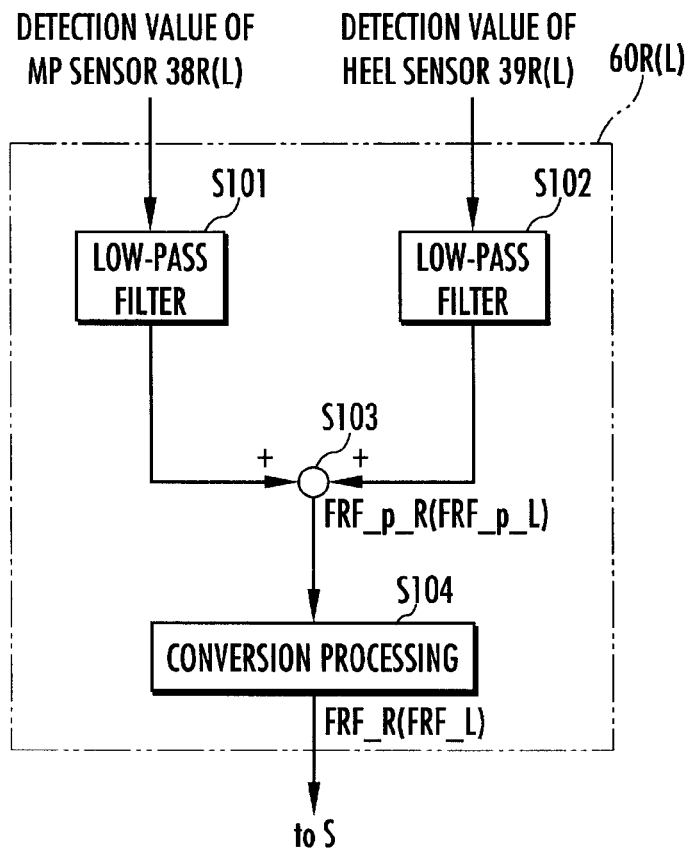
FIG. 6 is a block diagram showing the flows of the processing of treading force measurement processing means 60R and 60L.
Figure 7:
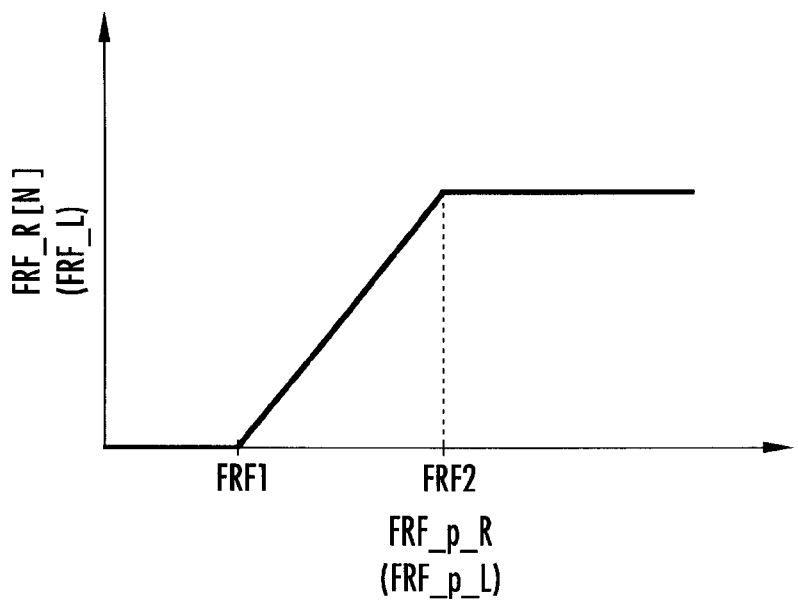
FIG. 7 is a graph showing a table used for the processing in S104 of FIG. 6.
Figure 8:
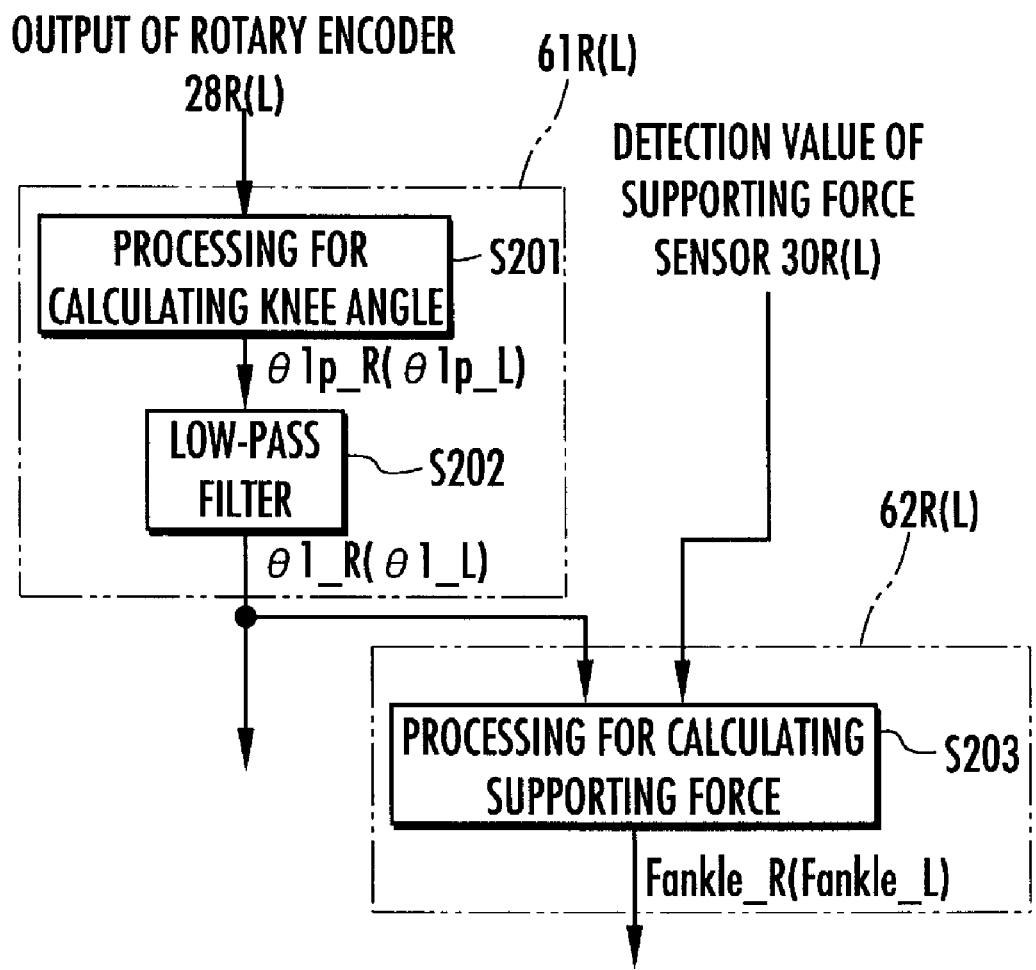
FIG. 8 is a block diagram showing the flows of the processing of knee angle measurement processing means 61R and 61L and the processing of supporting force measurement processing means 62R and 62L.
Figure 9:
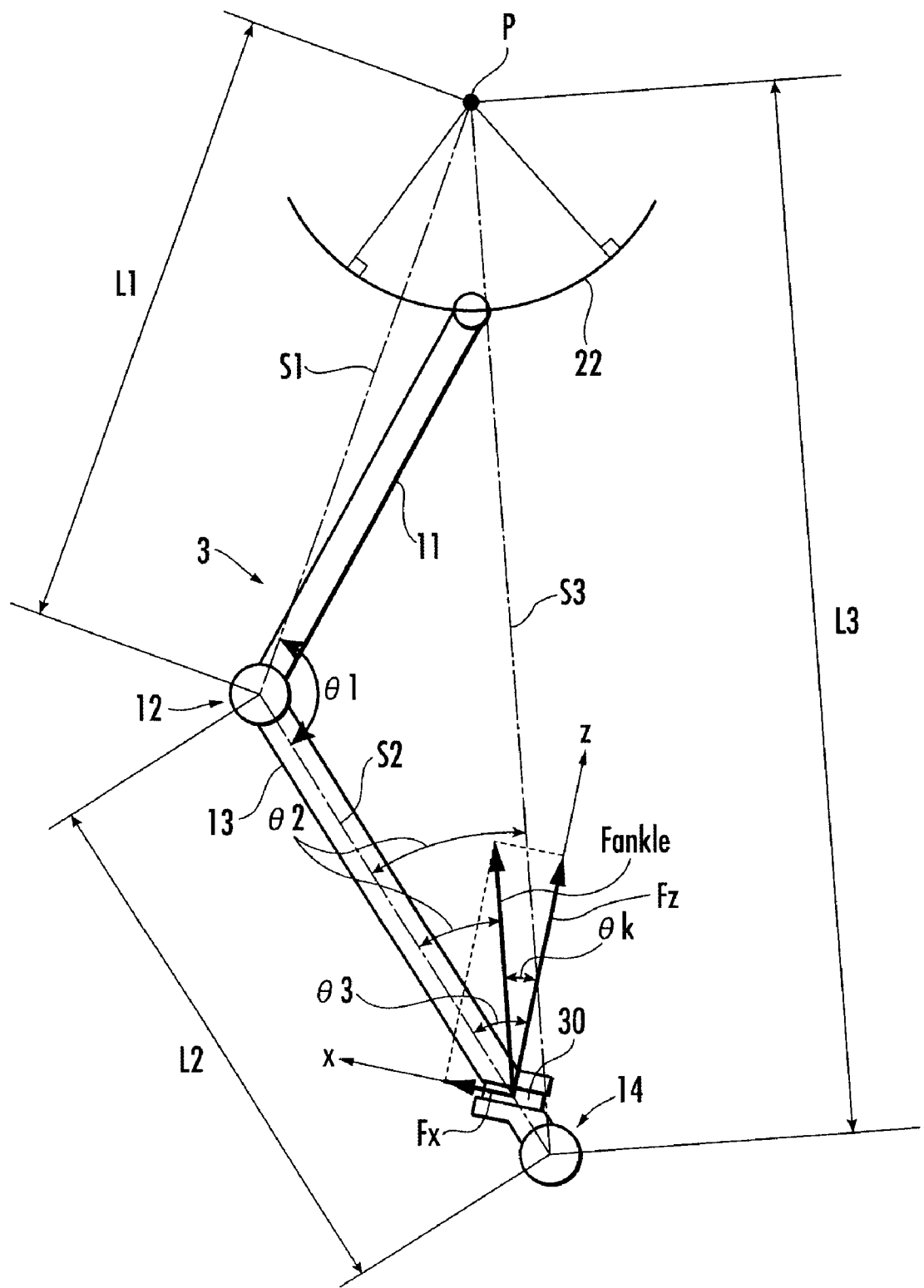
FIG. 9 is a diagram for explaining the processing in S201 and S203 of FIG. 8.
Figure 10:
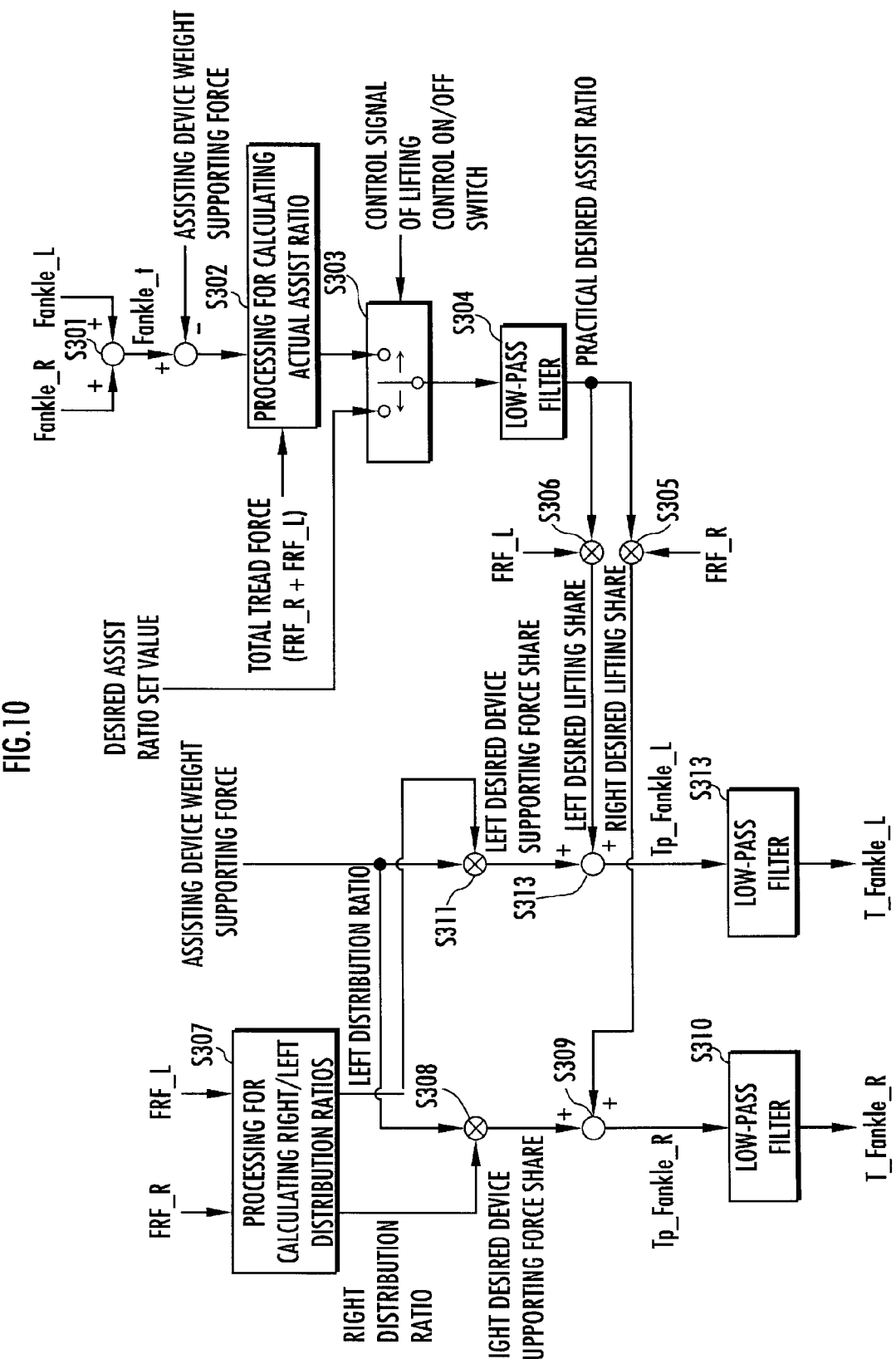
FIG. 10 is a block diagram showing the flow of the processing of a right/left desired share determining means 63.
Figure 11:
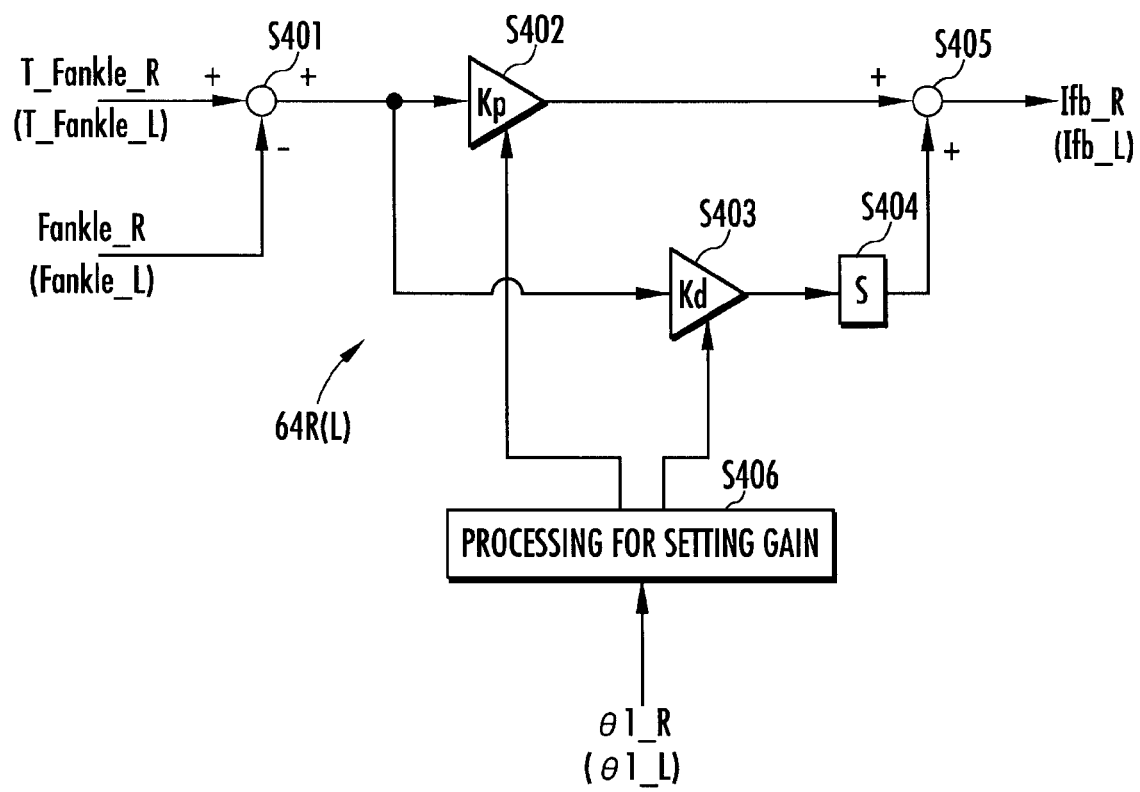
FIG. 11 is a block diagram showing the flows of the processing of feedback manipulated variable determining means 64R and 64L.
Figure 12:
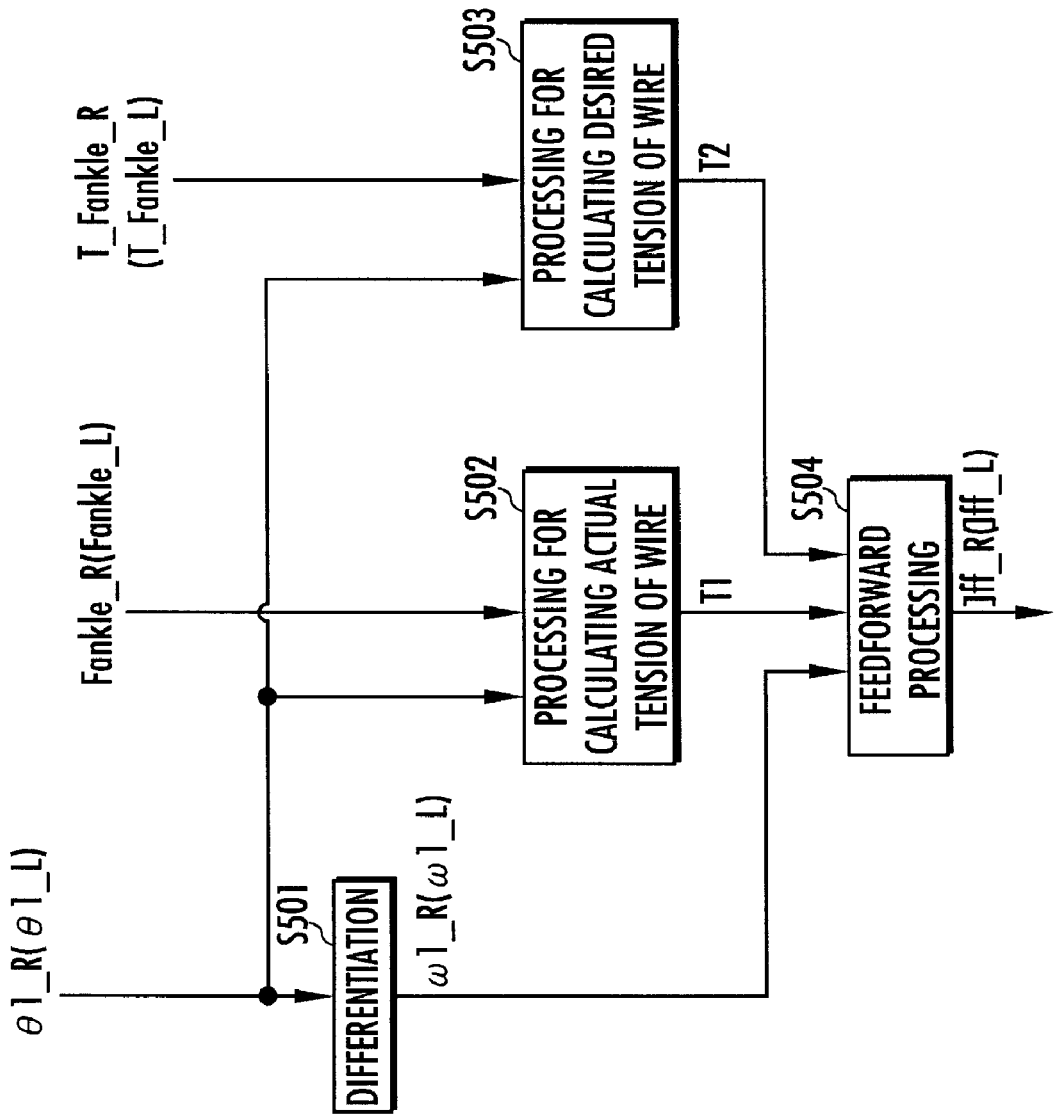
FIG. 12 is a block diagram showing the flows of the processing of feedforward manipulated variable determining means 65R and 65L.
Figure 13:
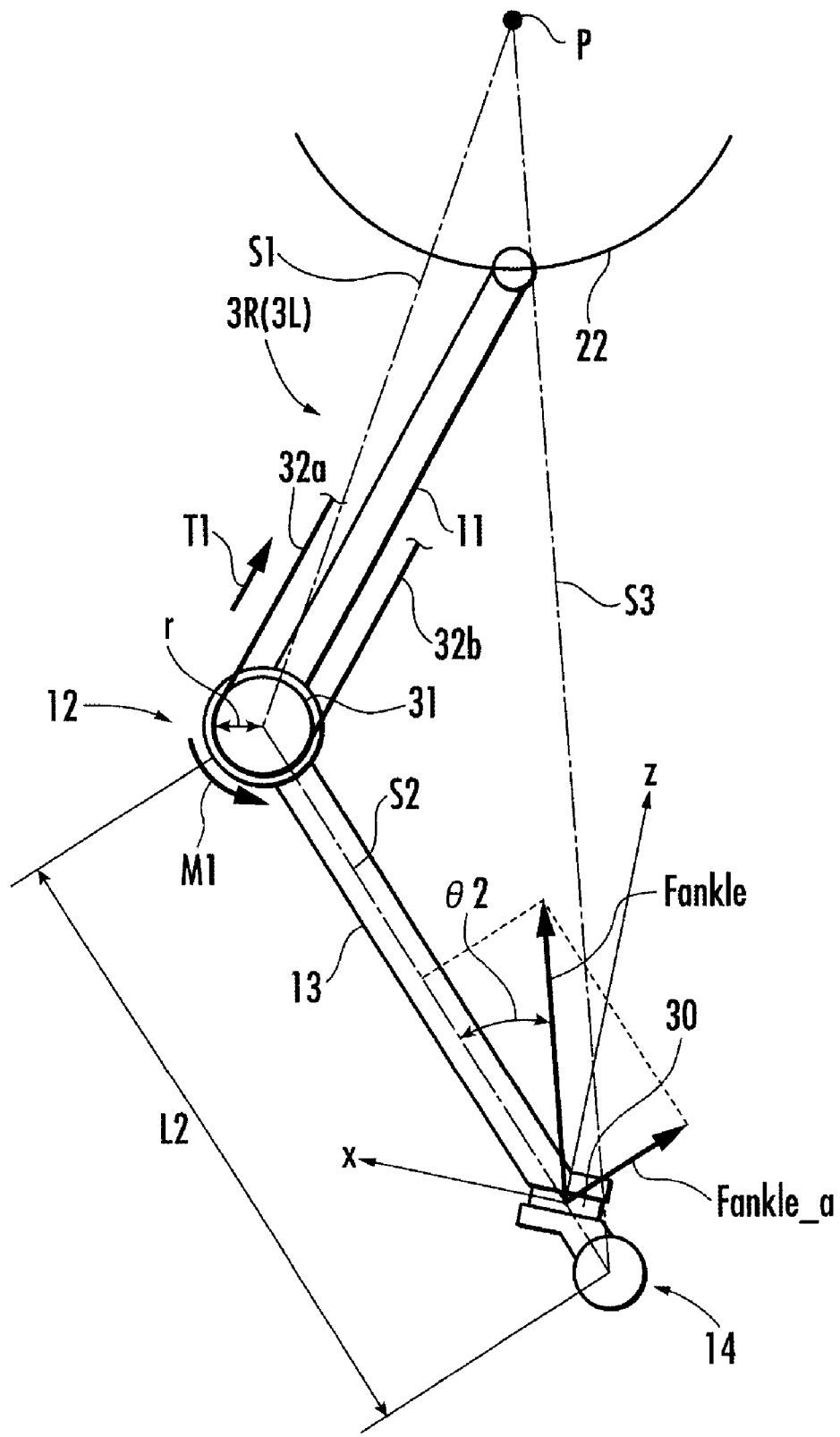
FIG. 13 is a diagram for explaining the processing of S502 of FIG. 12.
Figure 14:
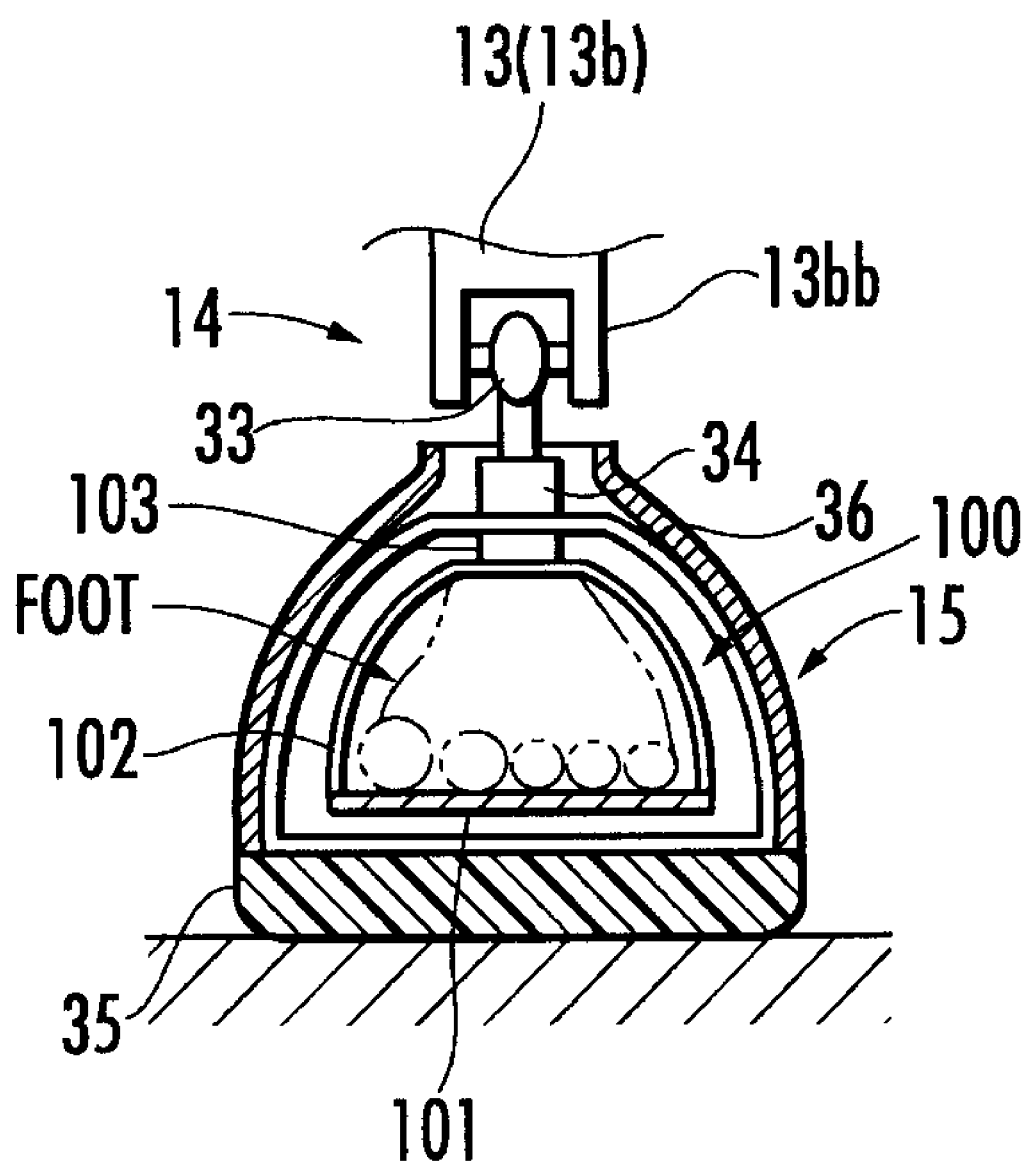
FIG. 14 is a diagram showing the construction of a foot-worn assembly in a second embodiment of the present invention.

The invention claimed is:

1. A control device of a walking assisting device having a left and right side, the walking assisting device provided with a seating part that receives from above a part of a weight of a user sitting thereon, a pair of right and left thigh frames joined respectively to the seating part through an intermediary of first joints, a pair of right and left crus frames joined respectively to the thigh frames through an intermediary of second joints, a pair of right and left foot-worn assemblies that are respectively joined to the crus frames through an intermediary of third joints and respectively configured for attaching to feet of a right and left leg of the user and for coming into contact with the ground when the legs of the user become standing legs, an actuator for the left side of the device for driving the second joint among joints of a left leg link composed of the first joint, the thigh frame, the second joint, the crus frame, the third joint, and the foot-worn assembly on the left side, and an actuator for the right side of the device for driving the second joint among joints of a right leg link composed of the first joint, the thigh frame, the second joint, the crus frame, the third joint, and the foot-worn assembly on the right side, the control device comprising:

a treading force measuring element adapted to capture a treading force of each leg of the user from an output of a force detection value indicated by a first force sensor provided in each of the foot-worn assemblies;

a desired assist ratio setting means for setting a desired assist ratio, which is a desired value of a ratio of a force to be supplied by the walking assisting device in a total treading force, which is a total sum of the treading forces of the legs of the user, relative to the total treading force;

a desired lifting share determining means for determining a desired lifting share which is a desired value of a share of the left leg link and a desired lifting share which is a desired value of a share of the right leg link in an upward lifting force to be applied to the user from the seating part by multiplying the treading force of each leg of the user, which has been measured by the treading force measuring element, by the desired assist ratio; and an actuator controller adapted to control the actuator for the left side of the device such that a lifting force actually imparted to the seating part from the left leg link becomes the desired lifting share of the left leg link determined by the desired lifting share determining means and also to control the actuator for the right side of the device such that a lifting force actually imparted to the seating part from the right leg link becomes the desired lifting share of the right leg link determined by the desired lifting share determining means.

2. The control device of a walking assisting device according to claim 1, wherein the foot-worn assembly of each of the leg links comprises an annular member for inserting the foot of the user, to which the foot-worn assembly is to be attached, from a toe end thereof, and the foot-worn assembly is joined to the third joint of the leg link through an intermediary of the annular member.

3. The control device of a walking assisting device according to claim 1, wherein the first force sensor of each of the foot-worn assemblies comprises one or more force sensors provided in each foot-worn assembly such that, when each leg of the user becomes the standing leg, the force sensors are positioned between at least either a location of a metatarsophalangeal joint or a location of a heel of the foot on a bottom surface of the foot of the standing leg and the floor, and the treading force measuring element takes a total sum of force detection values indicated by outputs of the force sensors constituting the first force sensor of each foot-worn assembly as a force detection value of the first force sensor and measures the treading force of the leg of the user that has the foot-worn assembly attached thereto on the basis of the force detection value of the total sum.

4. The control device of a walking assisting device according to claim 2, wherein a foot supporting member for supporting the foot of the user is disposed in the annular member of each of the foot-worn assemblies such that it does not come in contact with the annular member, and the foot supporting member is suspended in the annular member through an intermediary of the first force sensor.

5. The control device of a walking assisting device according to claim 1, wherein if a force detection value of the first force sensor of each of the foot-worn assemblies is a predetermined first threshold value or less, then the treading force measuring element sets a measurement value of the treading force of the foot attached to the foot-worn assembly to zero.

6. The control device of a walking assisting device according to claim 1, wherein if a force detection value of the first force sensor of each of the foot-worn assemblies is a predetermined second threshold value or more, then the treading force measuring element obtains a predetermined upper limit value, which is set beforehand, as the measurement value of a treading force of the foot attached to the foot-worn assembly.

7. A control program on a processor for controlling a walking assisting device, the walking assisting device having a left side and a right side and comprising a seating part that receives from above a part of a weight of a user sitting thereon, a pair of right and left thigh frames respectively joined to the seating part through an intermediary of first joints, a pair of right and left crus frames respectively joined to the thigh frames through an intermediary of second joints, a pair of right and left foot-worn assemblies that are respectively joined to the crus frames through an intermediary of third joints, respectively configured for attaching to feet of a right and left leg of the user and for coming into contact with the ground when the legs of the user become standing legs, an actuator for the left side of the device for driving the second joint among joints of a left leg link composed of the first joint, the thigh frame, the second joint, the crus frame, the third joint, and the foot-worn assembly on the left side, an actuator for the right side of the device for driving a second joint among joints of a right leg link composed of the first joint, the thigh frame, the second joint, the crus frame, the third joint, and the foot-worn assembly on the right side, and a first force sensor provided in each of the foot-worn assemblies for measuring a treading force of each leg of the user, the control program comprising the steps of:

capturing a treading force to be applied by the user to the floor from the foot of each leg of the user from a force detection value output by the first force sensor using a treading force measurement element;

determining a desired lifting share by capturing a set value of a desired assist ratio using an assist ratio key, where the desired assist ratio is a desired value of a ratio of a force to be supplied by the walking assisting device to a total treading force, and where the total treading force is a total sum of the treading forces of the legs of the user, relative to a total treading force, and multiplying the calculated treading force of each leg of the user by the set value of the desired assist ratio so as to determine the desired lifting share, wherein the desired lifting share is a desired lifting share value of the left leg link and a desired lifting share value of the right leg link in an upward lifting force to be applied to the user from the seating part; and controlling the actuator for the left side of the device such that the lifting force imparted to the seating part from the left leg link becomes the desired lifting share of the left leg link that has been determined and also controlling the actuator for the right side of the device such that the lifting force to be actually imparted to the seating part from the right leg link becomes the desired lifting share of the right leg link that has been determined.

8. The control program of a walking assisting device according to claim 7, wherein the first force sensor of each of the foot-worn assemblies comprises one or more force sensors provided on each foot-worn assembly such that, when each leg of the user becomes the standing leg, the force sensors lie between at least one of a location of a metatarsophalangeal joint and a location of a heel of the foot on a bottom surface of the foot of the standing leg and the floor, and the step of calculating the treading force includes taking a total sum of the force detection values indicated by outputs of the force sensors constituting the first force sensor of each foot-worn assembly as the force detection value of the first force sensor, and calculating the treading force of the leg of the user, to which the foot-worn assembly has been attached, on the basis of the force detection value of the total sum.

9. The control program of a walking assisting device according to claim 7, wherein the step of calculating the treading forces includes setting a value of the treading force of the foot having the foot-worn assembly attached thereto to zero if the force detection value of the first force sensor of each of the foot-worn assemblies is a predetermined first threshold value or less.

10. The control program of a walking assisting device according to claim 7, wherein the step of calculating the treading forces includes obtaining a predetermined upper limit value, which is set beforehand, as a value of the treading force of the foot having the foot-worn assembly attached thereto if the force detection value of the first force sensor of each of the foot-worn assemblies is a predetermined second threshold value or more.

\* \* \* \* \*